(12) United States Patent
Ström et al.

(10) Patent No.: US 12,341,958 B2
(45) Date of Patent: Jun. 24, 2025

(54) COMBINED LOOP FILTERING

(71) Applicant: Telefonaktiebolaget LM Ericsson (publ), Stockholm (SE)

(72) Inventors: Jacob Ström, Stockholm (SE); Per Wennersten, Årsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 6 days.

(21) Appl. No.: 18/277,974

(22) PCT Filed: Jan. 31, 2022

(86) PCT No.: PCT/SE2022/050100
§ 371 (c)(1),
(2) Date: Aug. 18, 2023

(87) PCT Pub. No.: WO2022/211693
PCT Pub. Date: Oct. 6, 2022

(65) Prior Publication Data
US 2024/0155119 A1 May 9, 2024

Related U.S. Application Data

(60) Provisional application No. 63/167,803, filed on Mar. 30, 2021.

(51) Int. Cl.
*H04N 19/117* (2014.01)
*H04N 19/167* (2014.01)
(Continued)

(52) U.S. Cl.
CPC ......... *H04N 19/117* (2014.11); *H04N 19/167* (2014.11); *H04N 19/196* (2014.11); *H04N 19/176* (2014.11)

(58) Field of Classification Search
CPC .. H04N 19/117; H04N 19/167; H04N 19/196; H04N 19/176
See application file for complete search history.

(56) References Cited

U.S. PATENT DOCUMENTS

2014/0286391 A1* 9/2014 Kim ............... H04N 19/176
375/240.02
2014/0301487 A1* 10/2014 Laroche ........... H04N 19/117
375/240.29
(Continued)

FOREIGN PATENT DOCUMENTS

EP 2777253 * 11/2012
WO 2011094047 A1 8/2011
(Continued)

OTHER PUBLICATIONS

International Search Report and Written Opinion dated Feb. 28, 2022, issued in International Patent Application No. PCT/SE2022/050100 (15 pages).
(Continued)

*Primary Examiner* — Zaihan Jiang
(74) *Attorney, Agent, or Firm* — Rothwell, Figg, Ernst & Manbeck, P.C.

(57) ABSTRACT

There is provided a method for encoding one or more images. The method comprises filtering, with a first filter, input samples I(x,y) to generate a first filtered output Ifirst(x,y)=I(x,y)+ΔIfirst(x,y). The method comprises estimating parameters for a second filter based at least in part on the first filtered output Ifirst(x,y), the input samples I(x,y), and original samples Iorig(x,y). The method comprises filtering, with the second filter, input samples I(x,y) to generate a second filtered output Isecond(x,y)=I(x,y)+ΔIsecond(x,y), wherein filtering, with the second filter, is based at least in part on the parameters estimated for the second filter. The
(Continued)

method comprises generating a combined output ICOMB $(x,y)=I(x,y)+\Delta Ifirst(x,y)+\Delta Isecond(x,y)$.

12 Claims, 18 Drawing Sheets

(51) Int. Cl.
*H04N 19/196* (2014.01)
*H04N 19/176* (2014.01)

(56) References Cited

U.S. PATENT DOCUMENTS

| | | | | |
|---|---|---|---|---|
| 2017/0099492 | A1* | 4/2017 | Byun | H04N 19/172 |
| 2019/0082176 | A1 | 3/2019 | Zhang et al. | |
| 2019/0373258 | A1* | 12/2019 | Karczewicz | H04N 19/70 |
| 2020/0296364 | A1 | 9/2020 | Rusanovskyy et al. | |
| 2021/0051320 | A1 | 2/2021 | Tourapis et al. | |
| 2022/0295054 | A1* | 9/2022 | Zhao | H04N 19/117 |
| 2022/0303585 | A1* | 9/2022 | Zhao | H04N 19/70 |
| 2022/0303586 | A1* | 9/2022 | Du | H04N 19/186 |
| 2023/0156185 | A1* | 5/2023 | Zhao | H04N 19/182 375/240.25 |
| 2023/0156232 | A1* | 5/2023 | Peringassery Krishnan | H04N 19/46 375/240.26 |
| 2024/0223816 | A1* | 7/2024 | Jumakulyyev | H04N 19/82 |
| 2024/0283926 | A1* | 8/2024 | Zhao | H04N 19/117 |

FOREIGN PATENT DOCUMENTS

| | | |
|---|---|---|
| WO | 2013053324 A1 | 4/2013 |
| WO | 2020182620 A1 | 9/2020 |
| WO | 2020260415 A1 | 12/2020 |
| WO | 2020260668 A1 | 12/2020 |

OTHER PUBLICATIONS

H. Wang et al—"AHG11: Neural Network-based In-Loop Filter", Joint Video Experts Team (JVET) of ITU-T SG 16 WP 3 and ISO/IEC JTC 1/SC 29, JVET-T0079-v3, 20th Meeting, Oct. 7-16, 2020 (pp. 1-10).

Per Wennersten et al., "Bilateral Filtering for Video Coding", IEEE Visual Communications and Image Processing, Dec. 10-13, 2017 (4 pages).

J. Strom et al., "Combined bilateral/SAO loop filter", Joint Video Experts Team (JVET) of ITU-T SG 16 WP 3 and ISO/IEC JTC 1/SC 29/WG 11, JVET-O0548, 15th Meeting: Gothenburg, SE, Jul. 3-12, 2019 (pp. 1-6).

J. Strom et al., "CE1-related: Multiplication-free bilateral loop filter", Joint Video Experts Team (JVET) of ITU-T SG 16 WP 3 and ISO/IEC JTC 1/SC 29/WG 11, JVET-N0493_v2, 14th Meeting: Geneva, CH, Mar. 19-27, 2019 (pp. 1-8).

J. Ström et al., "CE2 related: Reduced complexity bilateral filter", Joint Video Experts Team (JVET) of Joint Video Experts Team of ITU-T SG 16 WP 3 and ISO/IEC JTC 1/SC 29/WG 11, jvet-k0274-v1, 11th Meeting: Ljubljana, SI, Jul. 10-18, 2018 (pp. 1-13).

S. Ikonin et al., "Non-CE: Hadamard transform domain filter", Joint Video Experts Team (JVET) of ITU-T SG 16 WP 3 and ISO/IEC JTC 1/SC 29/WG 11, JVET-M0468, 13th Meeting: Marrakech, MA, Jan. 9-18, 2019 (pp. 1-7).

J. Ström et al., "Non-CE: Reduced complexity bilateral filtering", Joint Video Experts Team (JVET) of ITU-T SG 16 WP 3 and ISO/IEC JTC 1/SC 29/WG 11, JVET-M0885-v2/v4, 13th Meeting: Marrakech, MA, Jan. 9-18, 2019 (pp. 1-3).

S. Ikonin et al., "CE1: Hadamard transform domain filter (CE1-2)", Joint Video Experts Team (JVET) of ITU-T SG 16 WP 3 and ISO/IEC JTC 1/SC 29/WG 11, JVET-N0478-v3, 14th Meeting: Geneva, CH, Mar. 19-27, 2019 (pp. 1-16).

J. Ström et al., "CE1: Bilateral filter tests", Joint Video Experts Team (JVET) of ITU-T SG 16 WP 3 and ISO/IEC JTC 1/SC 29/WG 11, JVET-N0489_v2, 14th Meeting: Geneva, CH Mar. 19-27, 2019 (18 pages).

M. Karczewicz et al., "VVC In-Loop Filters", IEEE Transactions on Circuits and Systems for Video Technology, vol. 31, No. 10, Oct. 2021 (pp. 3907-3925).

J. Ström et al., "CE5-3.1 Combination of bilateral filter and SAO", Joint Video Experts Team (JVET) of ITU-T SG 16 WP 3 and ISO/IEC JTC I/Sc 29/WG 11, JVET-P0073_v3, 16th Meeting: Geneva, CH, Oct. 1-11, 2019, (pp. 1-18).

Jacob Ström et al: "Bilateral Loop Filter in Combination with SAO", 2019 Picture Coding Symposium (PCS), IEEE, Nov. 12, 2019 (Nov. 12, 2019), pp. 1-5.

Chih-Ming Fu et al: "Sample Adaptive Offset in the HEVC Standard", IEEE Transactions on Circuits and Systems for Video Technology, IEEE, USA, vol. 22, No. 12, Dec. 1, 2012 (Dec. 1, 2012), pp. 1755-1764.

* cited by examiner

COMBINED LOOP FILTERING

CROSS REFERENCE TO RELATED APPLICATIONS

This application is a 35 U.S.C. § 371 National Stage of International Patent Application No. PCT/SE2022/050100, filed Jan. 31, 2022, which claims priority to U.S. provisional patent application No. 63/167,803, filed Mar. 30, 2021, which is incorporated by this reference.

TECHNICAL FIELD

This disclosure relates to coding and decoding of video sequences and/or still images, and more particularly, to combined loop filtering used in such coding and decoding.

BACKGROUND

A video sequence may include one or more images, also called pictures. In this disclosure, the terms image and picture are used interchangeably. When viewed on a screen, an image consists of pixels, each pixel typically having a red, green and blue value (RGB). However, when encoding and decoding a video sequence, the image is often not represented using RGB but typically in another color space, including but not limited to YCbCr, ICTCP, non-constant-luminance YCbCr, and constant luminance YCbCr. If we take the example of YCbCr, it is made up of three components, Y, Cb and Cr. It is often the case that Y, which is called luma and which roughly represents luminance, is of full resolution, whereas the two other components, Cb and Cr, called chroma, are of a smaller resolution. A typical example is an HD video sequence containing 1920×1080 RGB pixels, which is often represented with a 1920×1080 resolution Y component, a 960×540 Cb component and a 960×540 Cr component. The elements in the components are called samples. In the example given above, there are therefore 1920×1080 samples in the Y component, and hence a direct relationship between samples and pixels. Therefore, in this document, the terms pixels and samples are often used interchangeably. For the Cb and Cr components, there is no direct relationship between samples and pixels; a single Cb sample typically influences several pixels.

In many video coding standards, the components Y, Cb and Cr are further partitioned into blocks. As an example, in Advanced Video Coding (AVC) the image is divided into macroblocks of 16×16 Y samples and 8×8 Cb and Cr samples representing the same 16×16 pixel area.

In High Efficiency Video Coding (HEVC), the image is divided into coding tree units (CTUs). A CTU has an N×N block of luma samples and M×M chroma samples for Cb and M×M chroma samples for Cr. An example is to use N=64 and M=32. The CTU can be split into four square blocks, which can in turn be split into four square blocks, recursively. This thus forms a splitting tree with the CTU as root and square blocks called coding units (CUs) as leaves.

In Versatile Video Coding (VVC), the image is divided into coding tree units (CTUs). A CTU has an N×N block of luma samples and M×M chroma samples for Cb and M×M chroma samples for Cr. A typical example is to use N=128 and M=64. Just as in the case for HEVC, the CTU can then be split into smaller blocks, but these do not have to be squares. As an example, a block can be split into two smaller blocks using a vertical split where the split blocks have the same width as the original block but half the height. This splitting can go on recursively, forming a splitting tree where the CTU is the root and the blocks at the leaves are called coding units (CUs). These CUs can be further divided into transform units, or TUs. In the decoder, the samples of a TU are first predicted, either by using samples from a previously decoded block in the same image (intra prediction), or using samples from a block in a previously decoded image (inter prediction), or a combination of the two.

As has previously been identified, bilateral filtering of image data directly after forming the reconstructed image block can be beneficial for video compression. As described by Wennersten et al., [1] it is possible to reduce the bit rate with maintained visual quality using the bilateral filter. (Bracketed numbers refer to references listed at the end of this disclosure.) The reduction in bit rate is measured in BD-rate (i.e. the Bjontegaard rate difference), where a negative delta-BD-rate figure of −1% means that we have managed to reduce the bit rate by 1% while maintaining the same visual quality. For the filter in [1], the delta-BD rate was −0.5% for a run-time increase of 3% (encode) and 0% (decode) for random access. The run time is the time it takes to encode or decode a sequence, and a low run time increase is therefore desirable. Since the filtering in this case happens directly after block reconstruction, we will refer to this type of bilateral filtering as post reconstruction bilateral filtering.

In VVC, after the image has been reconstructed, it goes through several stages of filtering. It is the filtered version of the image that is then used for prediction of future images that are yet to be encoded/decoded, and since the filtered image is thus used inside the coding loop, these filters are denoted as loop filters. This is to distinguish them from filtering where the result is not used for prediction, which is denoted post filtering. In VVC there are three loop filters; the deblocking filter, the sample adaptive offset (SAO) filter, and the adaptive loop filter (ALF). Both SAO and ALF rely on transmitted parameters. SAO identifies certain samples, for instance because they constitute a local maximum (the sample value is higher than those of its neighbors to the left and to the right). SAO can add an offset to all these identified samples. What offset to use is sent as a parameter from the encoder to the decoder. In the case of ALF, samples are filtered using one or more FIR filters. The coefficients of these filters can be sent as parameters from the encoder to the decoder.

In [2], it was described that a bilateral filter could be used as an additional loop filter to improve the coding efficiency of VVC. Thus, instead of bilaterally filtering blocks as they are decoded to make up the image, it is possible to wait until the entire image has been decoded, and then filter the entire image using bilateral filtering. In this document, we will refer to this type of bilateral filtering as bilateral loop filtering.

As an alternative to the bilateral filter, it is also possible to filter in the Hadamard domain. As described in [3], this can be done either directly after reconstructing each block (post-reconstruction Hadamard filtering) or as a loop filter (Hadamard loop filtering), just as in the case with the bilateral filter.

Other alternatives include filtering the reconstructed image using a neural network. As described in JVET-T0079-v3 [4], a neural network can be placed as yet another loop filter step after the ALF loop filter step.

As described above, some filters, such as the bilateral filter [1] and the Hadamard filter [3] can be placed as a post-reconstruction filter. However, post-reconstruction filtering comes with a problem in that latency is introduced from the point where the unfiltered samples are produced to the point where they have been filtered. This is problematic since the filtered samples can be needed for prediction of a neighboring block. This can be worked around by avoiding filtering small blocks and avoiding the use of pixels outside the block. Unfortunately though, this lowers compression efficiency in terms of BD-rate to about −0.35%, down from −0.5% (negative numbers indicate better compression efficiency) for the case of the bilateral filter.

Loop filtering can get better gains of around −0.45% but has another drawback in that is a separate stage where all samples have to be touched. The Versatile Video Coding standard (VVC) already contains three loop-filters; a deblocking filter, a filter called sample adaptive offset (SAO) and a filter called adaptive loop filter (ALF). Having many sequential filters can make a hardware implementation difficult since the filters are typically applied at least partly in parallel. Conceptually, loop filtering can be seen as happening sequentially: After the decoder has reconstructed all the blocks of the image, the entire image is then filtered using the deblocking filter. When this is finished, the entire deblocked image is then filtered using SAO, and when that is finished, the entire image is filtered using ALF. However, in a real decoder, this is not always what is happening. To avoid latency, and to not have to write and read images to and from memory several times, what typically happens is that these processes happen at least partly in parallel. We exemplify this with the last two loop filter stages, SAO and ALF: Assume a situation where SAO filtering happens before ALF. An efficient decoder may start ALF filtering as soon as a sufficient number of samples have been output by SAO. However, ALF may be very quick on some parts of the image and slow on other, while the opposite may be true for SAO. When ALF is quick it may catch up with SAO and will have to wait until SAO has produced sufficient data for it to continue. Then when ALF can start again it may hit a slow patch of image data and have trouble finishing in time. Introducing an extra loop filter stage is thus undesirable.

To ameliorate this problem, it is possible to combine two loop filters in one loop filter stage. This was introduced in [5], where a bilateral filter was included in the same loop filter stage as SAO. The way this works is that both the bilateral filter and SAO gets the same input samples $I(x,y)$ (the output samples from the previous stage, in this case from the deblocking filter). Then both filters produce an offset per sample: The bilateral filter produces $\Delta I_{BIF}(x,y)$ and SAO produces $\Delta I_{SAO}(x,y)$. The output sample $I_{COMB}$ is the sum of the non-filtered sample $I(x,y)$ and the two offsets: $I_{COMB}=I(x,y)+\Delta I_{BIF}(x,y)+\Delta I_{SAO}(x,y)$. This way bilateral filtering and SAO can happen in parallel, and no extra loop filter stage is needed. A hardware implementation can make sure to perfectly synchronize the two filters sample by sample, and hence no filter need to wait for the other.

However, this can make the parameter estimation of the individual loop filters difficult. As described above, for SAO, it is necessary to estimate parameters, such as which offset to use. If the SAO estimation happens on samples that have not been bilaterally filtered, over-filtering can happen. As an example, assume that the input intensity value $I(x,y)=500$ is too low in a pixel compared to the original value 510, and should ideally be ten intensity levels higher. The bilateral filter may be able to completely correct for this by selecting $\Delta I_{BIF}(x,y)=10$. However, the SAO parameter estimation method only gets the input $I(x,y)$, which is ten levels too low, and may also correct for this by selecting $\Delta I_{SAO}(x,y)=10$. The result will then be a combined value $I_{COMB}=I(x,y)+\Delta I_{BIF}(x,y)+\Delta I_{SAO}(x,y)=500+10+10=520$ which is 10 levels too high instead of ten levels too low—an overcorrection which is no better than the unfiltered pixel value $I(x,y)$. It should be noted that the original value can have different meanings. Typically, the original is just the picture before compression. Sometimes, however, some preprocessing may occur prior to compression, such as denoising or image stabilization. The original value may refer in different embodiments to the picture before compression, and may include preprocessing such as denoising or image stabilization, or may refer to the picture before such preprocessing occurs.

Therefore, a solution is proposed in [6] where the SAO parameter estimation is done on samples that are already bilaterally filtered. This avoids the over-filtering problem described above.

SUMMARY

FIG. 10 shows how the decoder handles two filters in the same loop filter stage. The output from the previous stage, for instance deblocking, is sent to both the bilateral filter (BIF) 1002 and the SAO filter 1003. Both stages calculate an offset and these are combined with the output from the previous stage to produce the output $I_{COMB}(x,y)=I(x,y)+\Delta I_{BIF}(x,y)+\Delta I_{SAO}(x,y)$. The output can also be clipped afterwards.

FIG. 11 shows in more detail how the SAO filtering 1003 works. Here, in 1101, some samples from a CTU block of, e.g., size 128×128 are identified as belonging to a certain class, for instance being a local minimum in the horizontal direction. Which class to use (minimum, maximum, etc.) may be obtained from the SAO parameters. In the next step 1102, these samples are added with an offset that is obtained from the SAO parameters. Finally a delta for all samples $\Delta I_{SAO}(x,y)$ is calculated. This will be zero for all samples outside the class and equal to the offset for samples in the class. It should be noted that the SAO parameters may also signal that SAO should be turned off for this CTU, in which case $\Delta I_{SAO}(x,y)$ is set to zero for all samples in the CTU.

On the encoding side, as described above, feeding the SAO parameter estimation with the samples $I(x,y)$ that have not been through bilateral filtering is not ideal since the SAO may do the same compensation as BIF. This is illustrated in FIG. 1. As can be seen, the SAO parameter estimation process 103 only gets the output from the previous stage $I(x,y)$ as input. FIG. 5 shows in more detail how the parameter estimation works. First, in step 501, samples $I(x,y)$ from the previous stage are investigated to identify which samples belong to a certain class. As an example, SAO can be triggered if a sample is a local maximum, for instance if the sample to the left and to the right are both lower than the current sample value. Now, in step 502, it is calculated how much these samples deviate from the original image. If it is found, for instance, that all samples that constitute a local maximum on average are two intensity levels higher than the original, err will be 2. In step 3, the offset is determined. It is often desirable to set the offset to be −round(err), so as to compensate for the average error. However, sometimes it can be too expensive to signal offsets, or perhaps another class is better (for instance one that instead looks for local minima instead of maxima). Therefore, there may also be logic to determine which class gives the best error or whether the SAO filter should be turned off entirely for the CTU. The output from 103 are the SAO parameters, such as offsets and which class to use. As described above, the problem with using the output from the previous stage $I(x,y)$ as input to 103 is that the error is calculated against $I(x,y)$ and not against $I(x,y)+\Delta I_{BIF}(x,y)$. This means that the offset calculated may be incorrect.

As also described above, this can be rectified by the solution proposed in [6], which is illustrated in FIG. 2. Here, instead of being fed the output from the previous stage I(x,y), the SAO parameter estimation 203 is instead fed the bilaterally filtered output $I_{BIF}(x,y)=I(x,y)+\Delta I_{BIF}(x,y)$. The details of the parameter estimation is described in FIG. 6. Here the calculation of the error in 602 is done correctly as $I_{BIF}(x,y)-I_{ORIG}(x,y)$. However, instead there is another problem: The identification of samples in 601 is now wrong. This is because in 601 this is done on bilaterally filtered samples, but in the decoder this determination is done on samples I(x,y) that have not been bilaterally filtered. This can be seen in FIG. 10 where the SAO filtering step 1003 is fed the output from the previous step I(x,y). This means that the SAO parameter estimation step may identify a sample in $I_{BIF}(x,y)$ as a maximum whereas the decoder, which will look for maxima in I(x,y), may not find a maximum in the same position.

Hence there will be an error in both cases, and the best SAO parameters may not be found in any of the prior art estimations of FIG. 1 and FIG. 2.

Embodiments disclosed herein avoid these parameter estimation problems (i.e., calculating the parameters against the wrong reference as well as calculating the wrong classifications) by feeding both the output from the previous stage I(x,y) and the filtered version $I_{BIF}(x,y)$ to the parameter estimation module. This is a general idea that can be used not only for BIF and SAO but for any two filters that are operating in parallel.

BRIEF DESCRIPTION OF THE DRAWINGS

The accompanying drawings, which are incorporated herein and form part of the specification, illustrate various embodiments.

DETAILED DESCRIPTION

Embodiments disclosed herein provide a way for an encoder to estimate parameters for one filter in the case where both filters are operating in parallel in the decoder. The idea is to efficiently estimate the parameters of the second filter. This is done by feeding in both the samples from the previous stage I(x,y), as well as the filtered samples $I_{first}(x,y)$ from the first filter. This way both the classification (detection, processing) will be performed correctly, i.e., exactly as in the decoder, and at the same time the error calculation will be done with the result for the first filter in mind. Alternatively it is possible to alter the reference from the original $I_{ORIG}(x,y)$ to $I_{ALTORIG}(x,y)=I_{ORIG}(x,y)-(I_{first}(x,y)-I(x,y))$.

Figure 1:
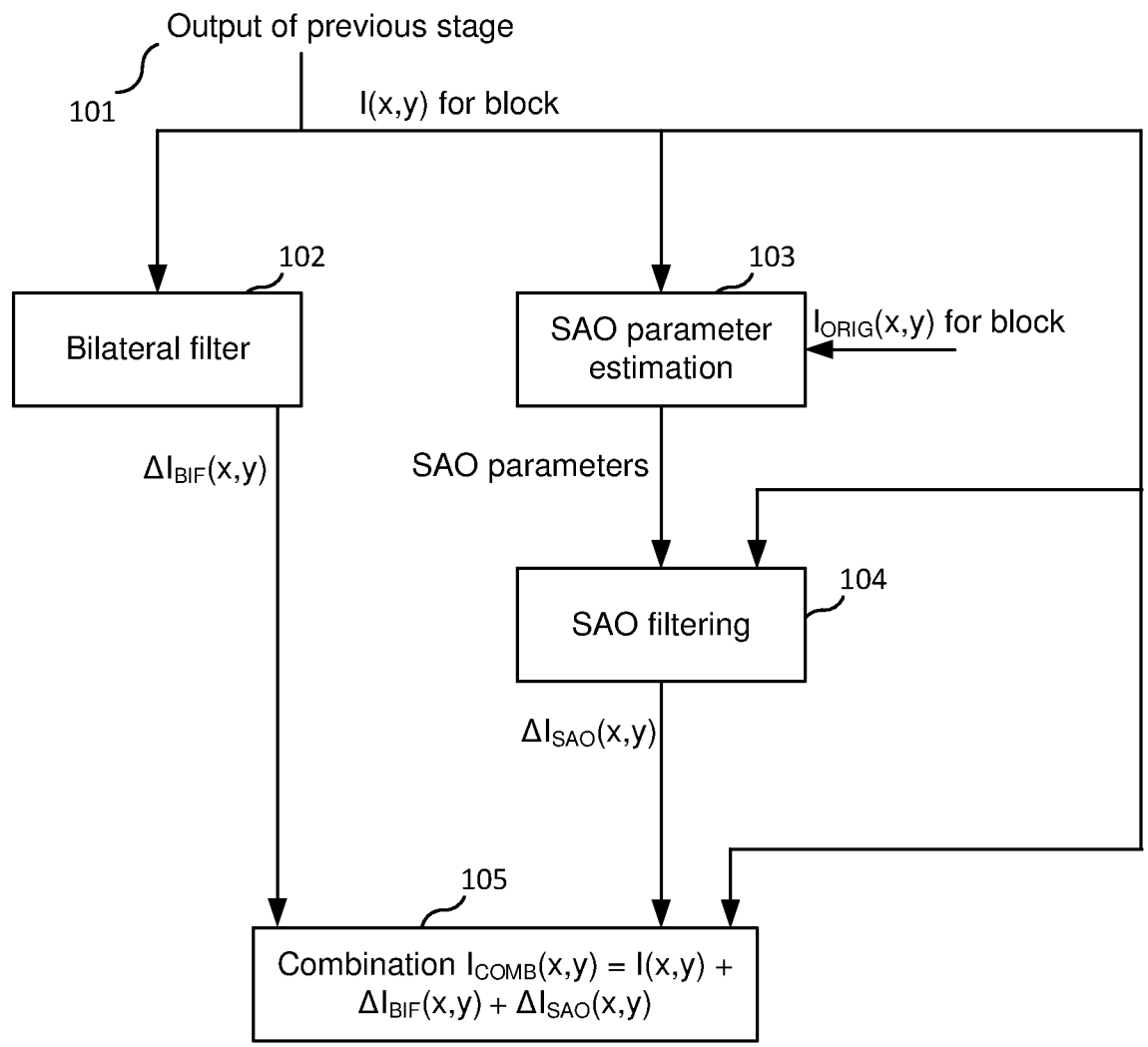
FIG. 1 is an example architecture of an encoder according to a related art system.
Figure 2:
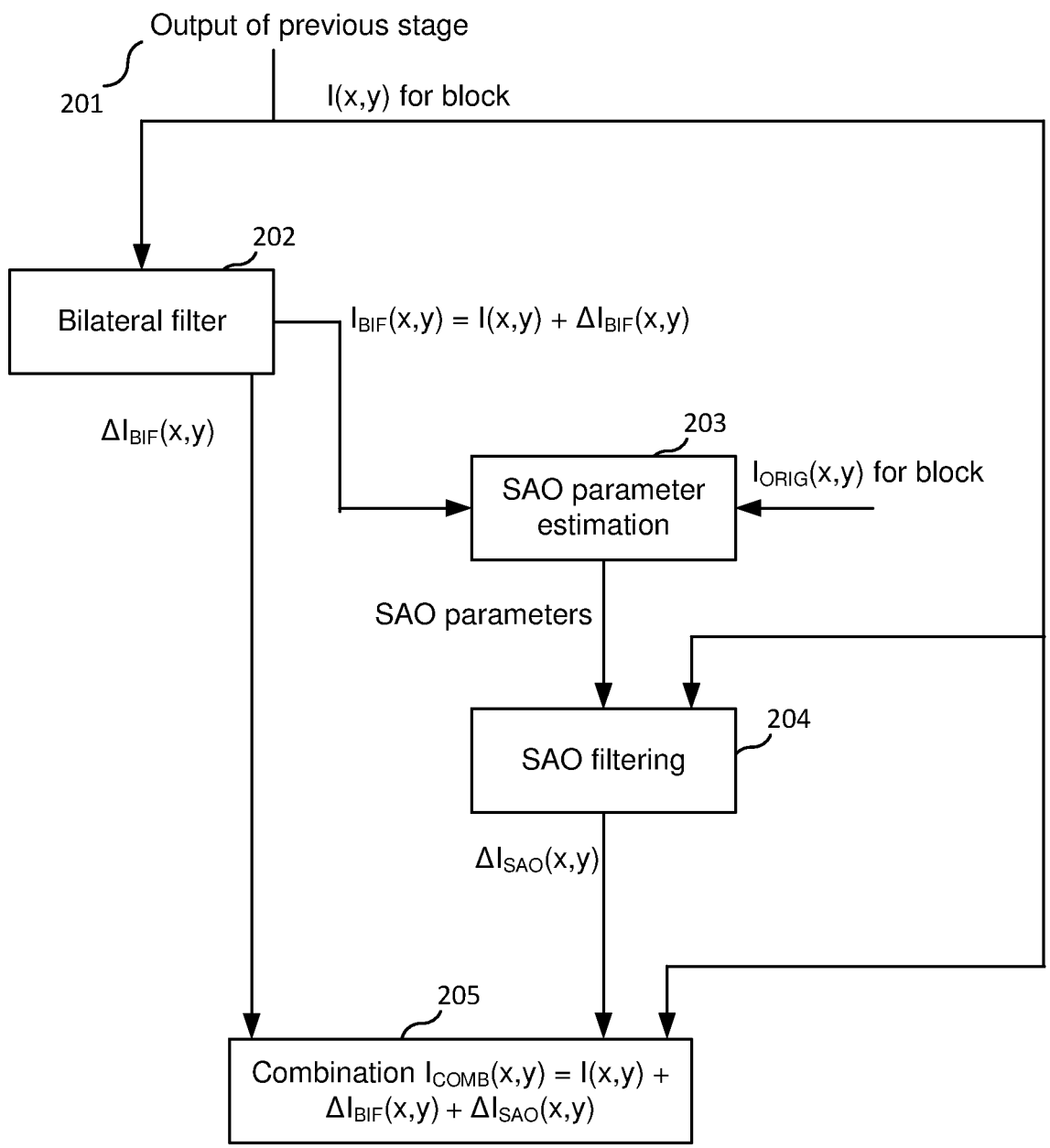
FIG. 2 is an example architecture of an encoder according to a related art system.
Figure 3:
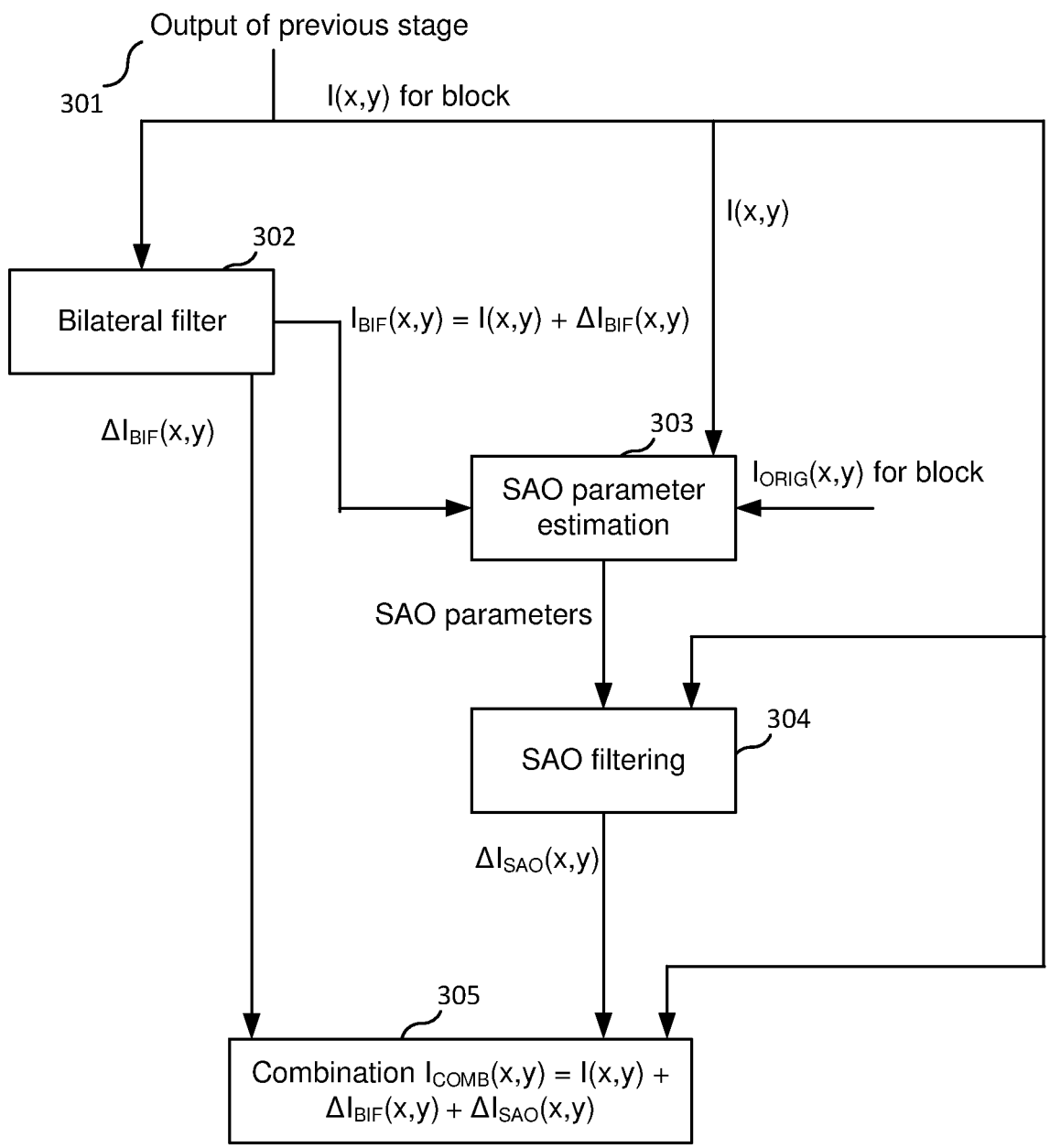
FIG. 3 is an example architecture of an encoder according to an embodiment.

FIG. 3 shows how parameter estimation is done according to an embodiment. The output samples I(x,y) from the previous stage are obtained at 301, and then are filtered with the bilateral filter 302, resulting in $\Delta I_{BIF}(x,y)$. The output of the bilateral filter 302, i.e. $I_{BIF}(x,y)=I(x,y)+\Delta I_{BIF}(x,y)$, is fed into the SAO parameter estimation stage 303. However, SAO parameter estimation stage 303 also gets the output samples I(x,y) from the previous stage as well as the original samples $I_{ORIG}(x,y)$. SAO filtering 304 is performed on the output samples I(x,y), using the estimated SAO parameters, resulting in $\Delta I_{SAO}(x,y)$. The combination $I_{COMB}$ is then calculated at 305 as $I_{COMB}(x,y)=I(x,y)+\Delta I_{BIF}(x,y)+\Delta I_{SAO}(x,y)$.

Figure 6:
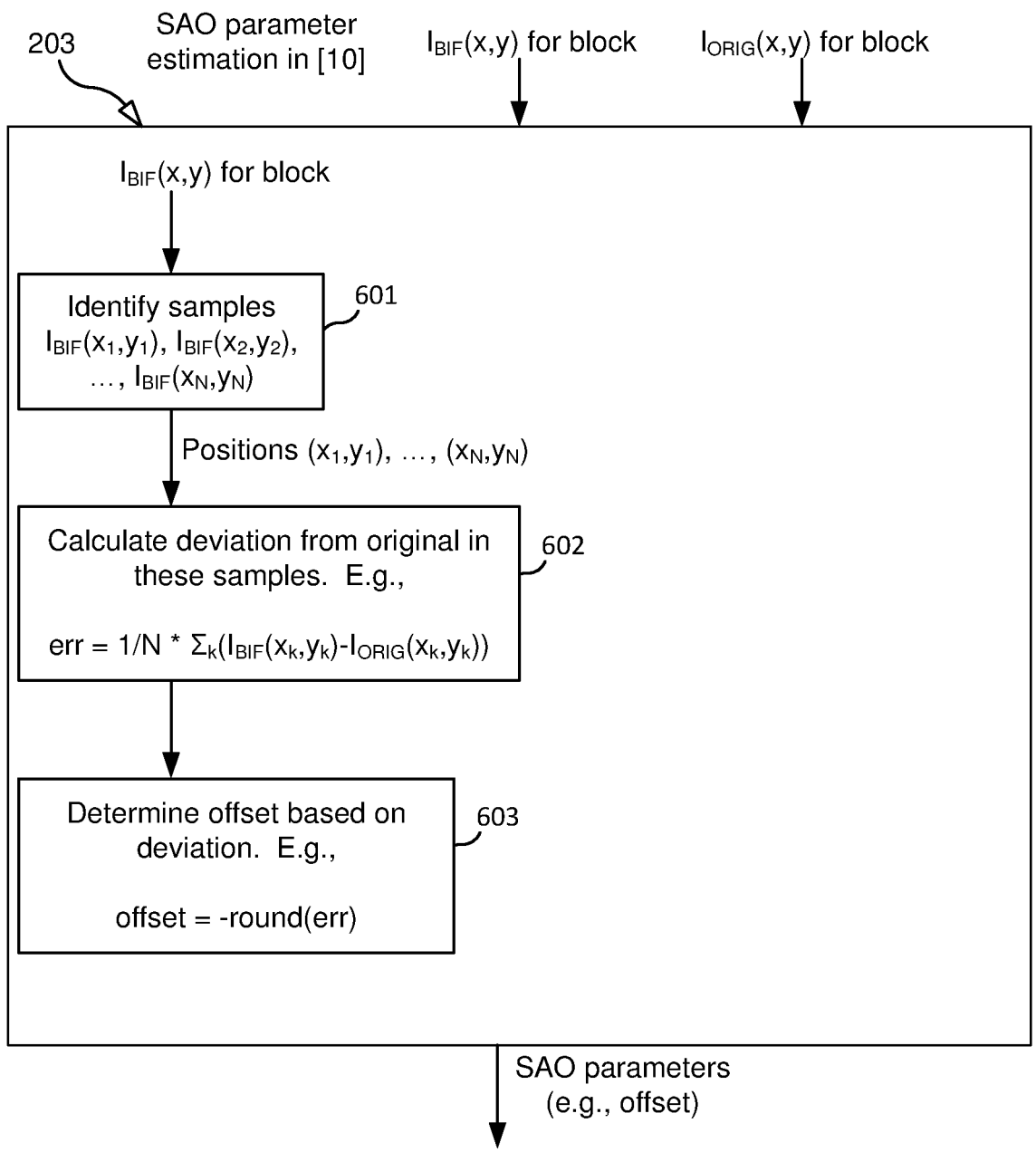
FIG. 6 is an example architecture of SAO parameter estimation according to a related art system.
Figure 7:
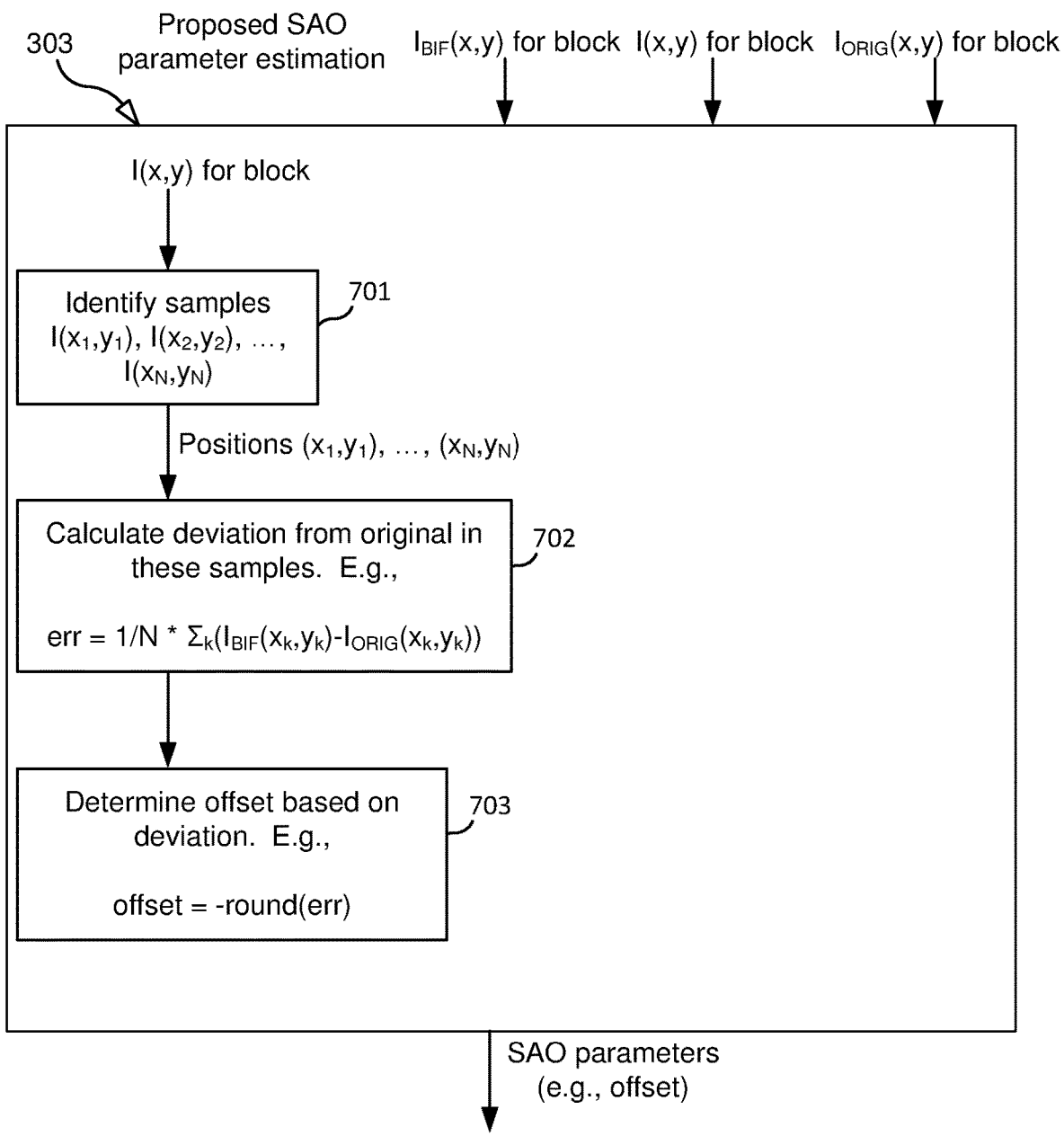
FIG. 7 is an example architecture of SAO parameter estimation according to an embodiment.

FIG. 7 shows in more detail how the SAO parameter estimation 303 works. The identification of which samples belong to a certain class is done in step 701, which takes the samples I(x,y) from the previous stage as input. This is different from step 601 in FIG. 6 where the bilaterally filtered samples were used. The calculation of the deviation from the original in 702 is done against the bilaterally filtered samples $I_{BIF}(x,y)$. This is different from step 503 in FIG. 5 where the samples I(x,y) from the previous stage are used.

Finally step 703 determines the best offset to use based on the deviations calculated in 702. This process 701, 702 and 703 may be done for all the different classifiers in SAO.

Figure 10:
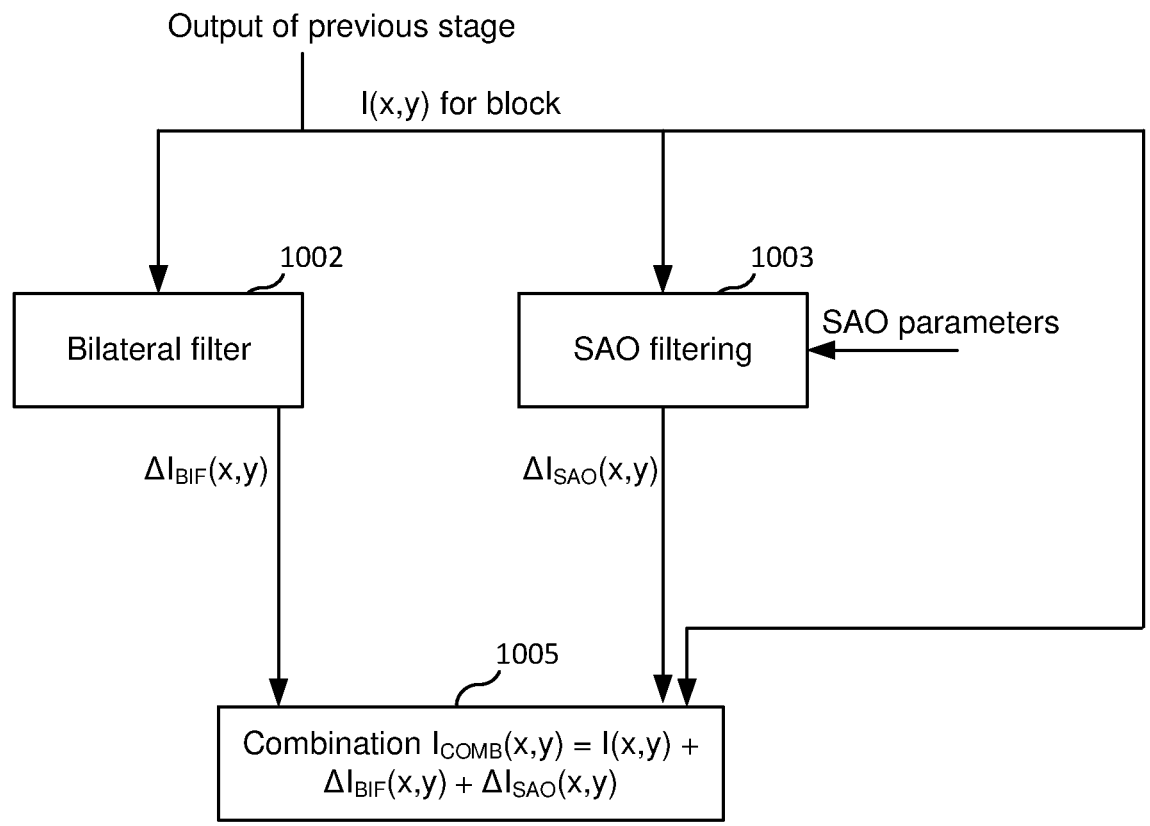
FIG. 10 is an example architecture of a decoder according to an embodiment.
Figure 11:
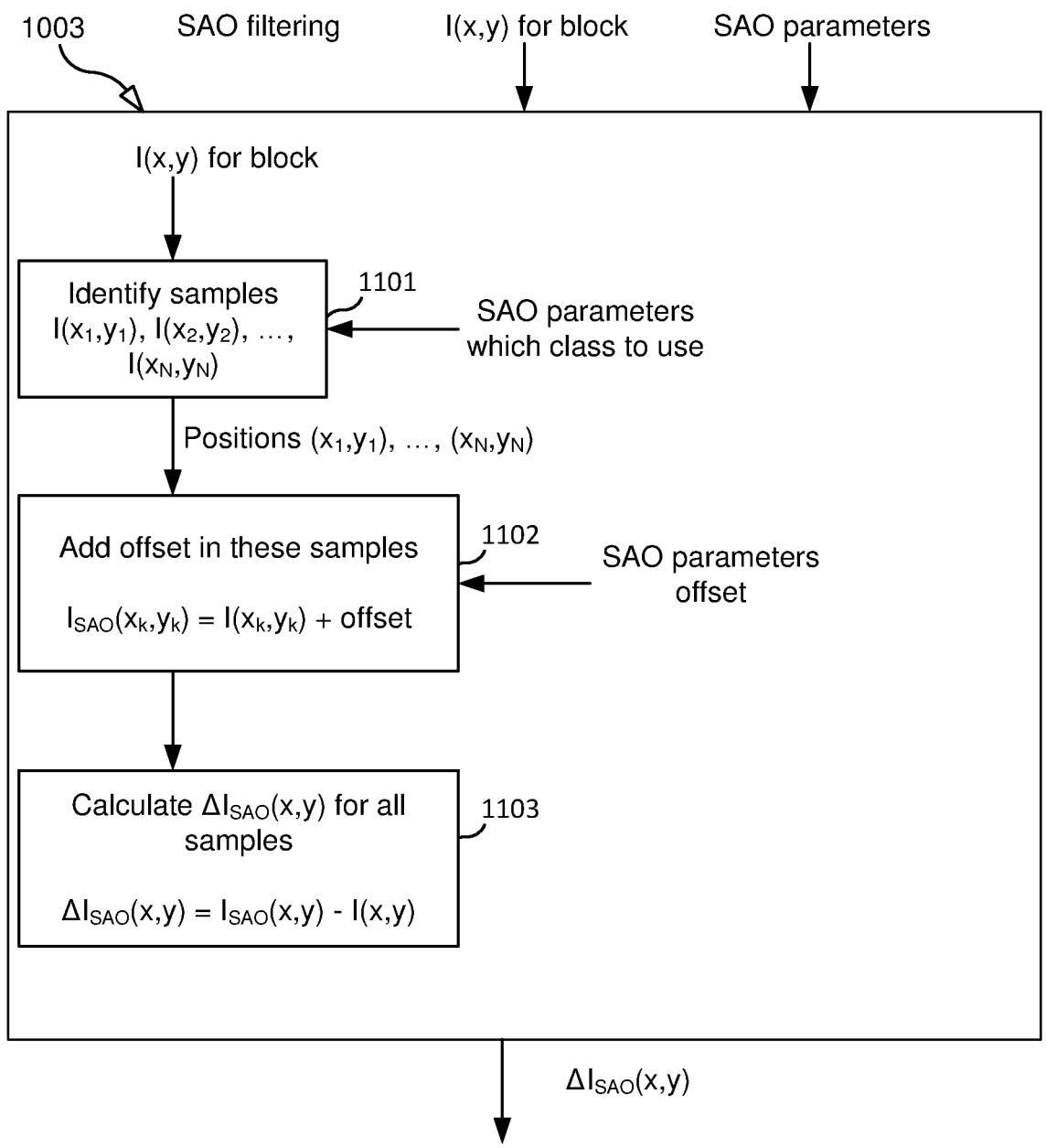
FIG. 11 is an example architecture of SAO filtering according to an embodiment.

The embodiment shown in FIGS. 3 and 7 solves both of the problems of the prior art solutions. In contrast to [6], it identifies the samples the same way as the decoder 1003 in FIG. 10 does, since it bases its identification on the samples I(x,y) from the previous stage. However, it also calculates the error with the bilateral filtering in mind, to avoid overcompensating during filtering, since it is using $I_{BIF}(x,y)$ in step 702.

This technique does not only apply to the case when bilateral filtering and SAO are used, but can be used in general as long as two filters share the same loop filtering stage, and when at least one of the filters uses transmitted parameters that need to be estimated in the encoder.

Figure 12:
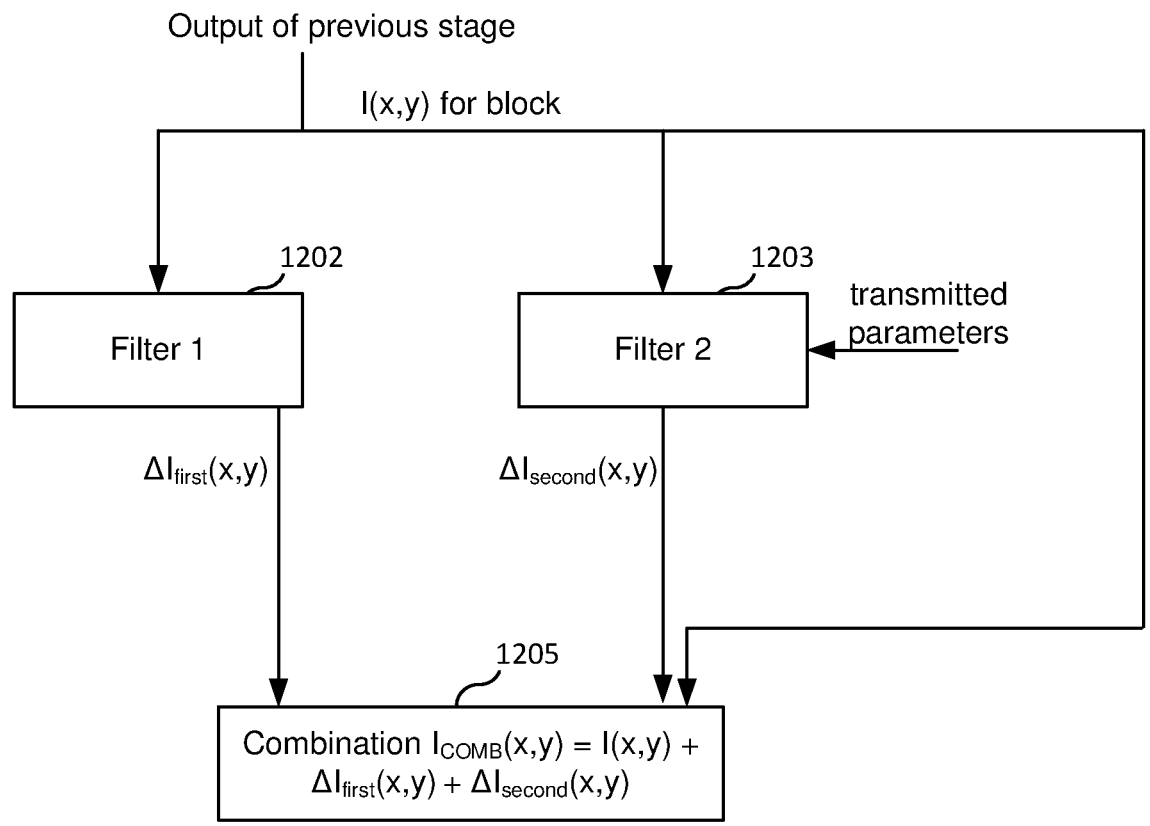
FIG. 12 is an example architecture of a decoder according to an embodiment.

This is shown more generally in the decoder of FIG. 12, where Filter 1 and Filter 2 share the same loop filtering stage, since they are both operating on the output samples I(x,y) of the previous stage. Filter 2 uses transmitted parameters that the encoder has estimated and sent to the decoder. The output of the two filters are combined in 1205 to produce the final output $I_{COMB}(x,y)$.

Figure 13:
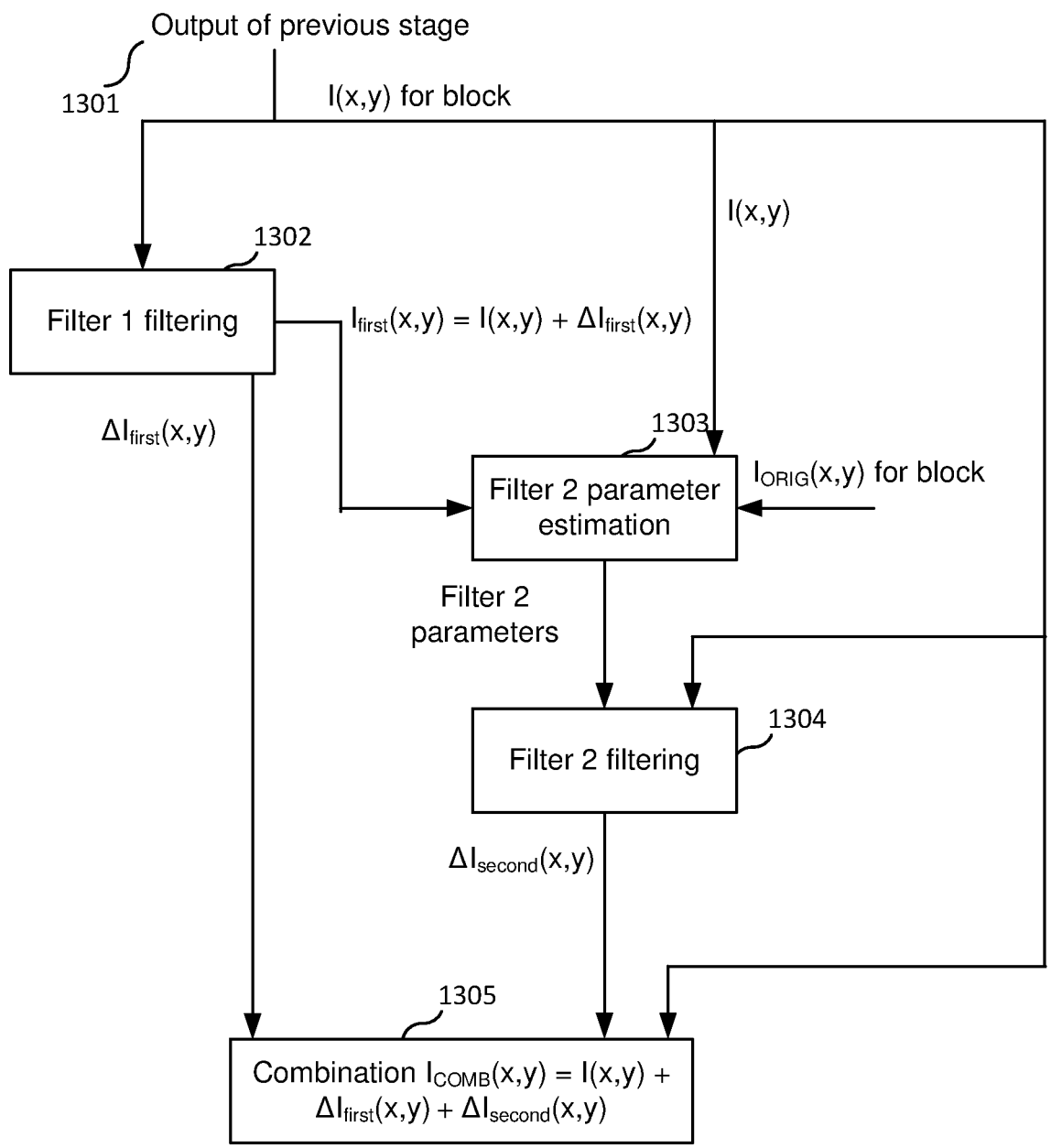
FIG. 13 is an example architecture of an encoder according to an embodiment.

In such a situation, the parameters for filter 2 may be estimated according to FIG. 13, in an embodiment. First, the output samples I(x,y) from the previous stage are obtained at 1301 and are filtered using filter 1 in step 1302. Then, the filtered output $I_{first}(x,y)$ together with the output samples I(x,y) from the previous stage and the reference $I_{ORIG}(x,y)$ are fed into the parameter estimation step 1303 for filter 2. In step 1303, I(x,y) should be used for classifying/processing/detection/etc., since this is what will be done in the decoder, while $I_{first}(x,y)$ should be used when calculating errors to estimate parameters. The parameters are then used to process I(x,y) in step 1304, and the resulting delta is used together with the delta from 1302 to produce $I_{COMB}(x,y)$ in step 1305.

It should be noted that we use "filter" as a general term of processing here, and it should not be restricted to finite impulse response filtering but can also mean more general processing such as processing with a neural network, as we shall see.

Figure 14:
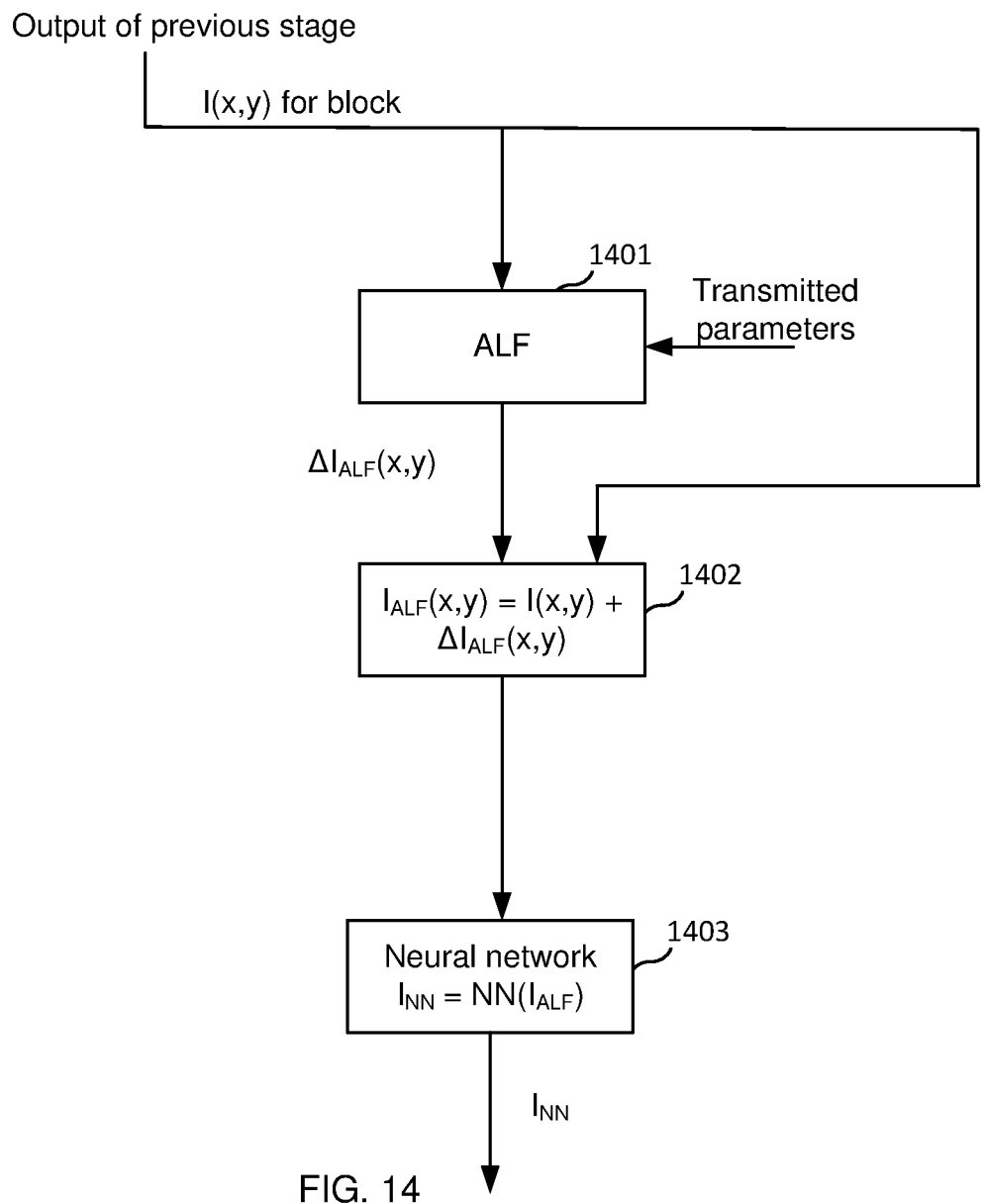
FIG. 14 is an example architecture of a decoder according to a related art system.

An example of two filters that could be beneficial to have in the same loop filter stage is the neural network filter from [4] and ALF. However, we will first have a look at how it is traditionally done in two different loop filter stages: In [4], the two filters are in different loop filter stages as can be seen in FIG. 14. The output samples I(x,y) from the previous stage are obtained in step 1401 together with the transmitted parameters, and the result is an offset per sample $\Delta I_{ALF}(x,y)$. These are then combined with the output samples I(x,y) from the previous stage resulting in ALF filtered samples $I_{ALF}(x,y)$. After that, step 1403 does a neural network filtering of the ALF filtered samples.

Figure 15:
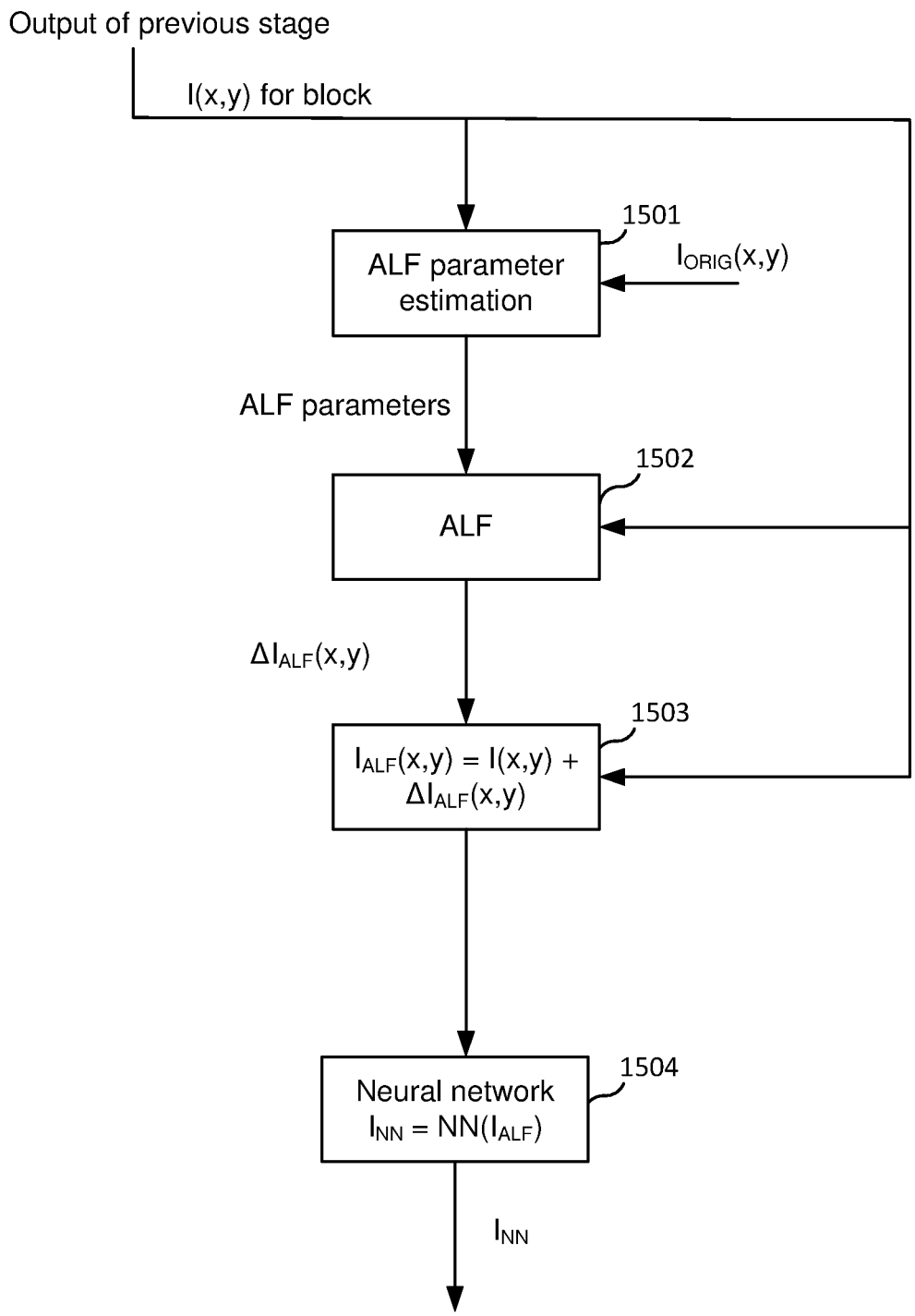
FIG. 15 is an example architecture of an encoder according to a related art system.

The encoder in this traditional case (where both filters are in their own loop filter stage) is shown in FIG. 15. Here, the output samples I(x,y) from the previous stage are fed into the ALF parameter estimation step 1501 together with the reference samples $I_{ORIG}(x,y)$. The output is ALF parameters which can then be used to filter the output samples I(x,y) from the previous stage to produce per-sample ALF offsets, which are then combined with I(x,y) in step 1503 to produce the ALF filtered samples. The encoder can then proceed with the neural network filtering in 1504.

Figure 8:
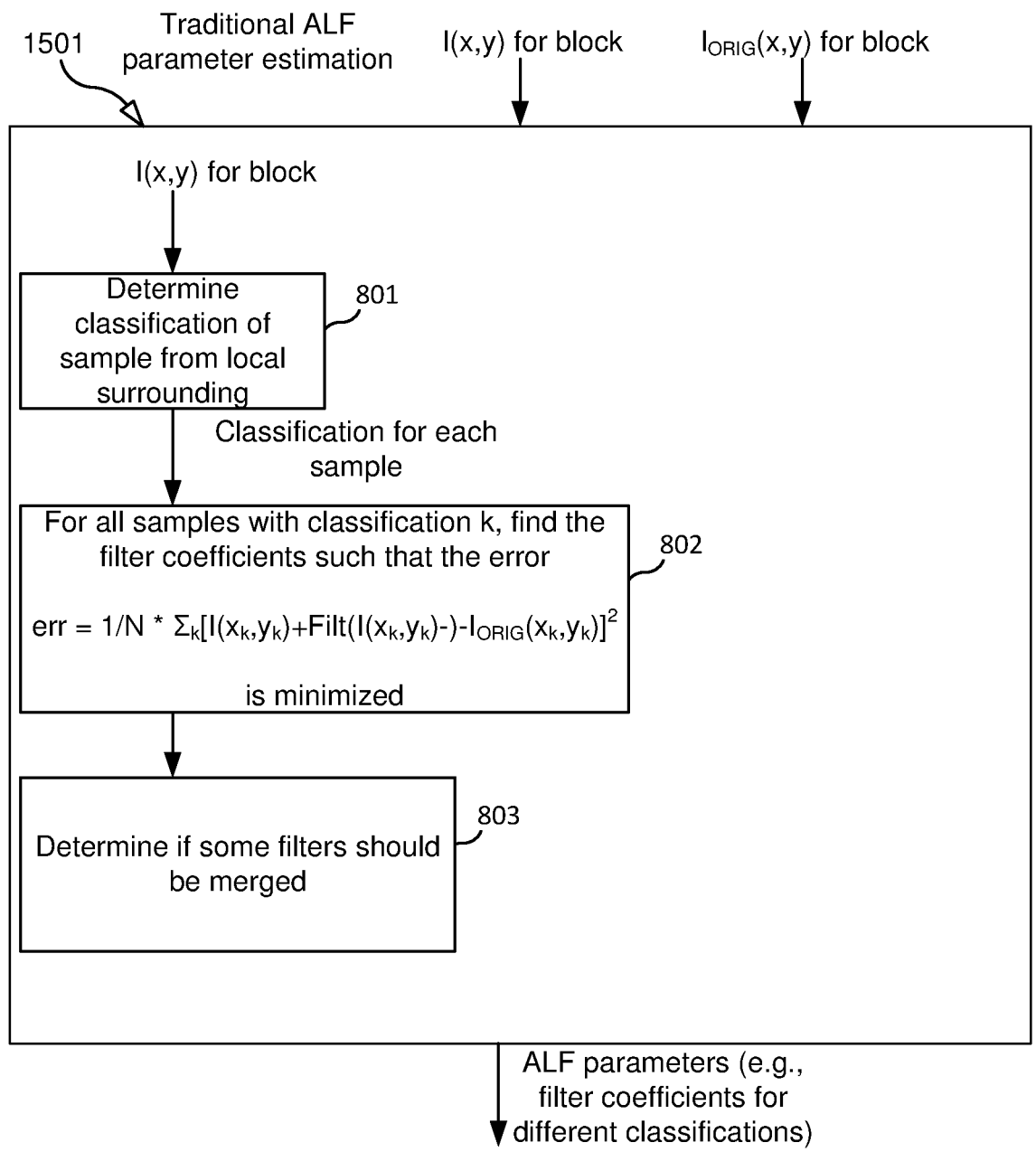
FIG. 8 is an example architecture of ALF parameter estimation according to a related art system.

The ALF parameter estimation step in 1501 is described in more detail in FIG. 8. The output samples I(x,y) from the previous step are input to step 801, that is used to classify each sample into one of several classes based on the locally surrounding samples. In VVC there are 25 classes that a sample can belong to, each can have a different filter. After every sample has been classified as belonging to one of the 25 classes, step 802 finds the best finite impulse response (FIR) filter for each class. This is done by finding the filter coefficient that minimizes the error $$err = \sum_{k}[I(x_k, y_k) + FILT(I(x_k, y_k)) - I_{ORIG}(x_k, y_k)]^2$$

for all samples k of a certain class. $FILT(I(x_k,y_k))$ is the output of the FIR filter in position $(x_k,y_k)$. (It should be noted that $FILT(I(x_k,y_k))$ depends not only on the sample $I(x_k,y_k)$ but also on surrounding samples.) Step 803 is then used to see if some filters should be merged. If two filters from different classes are similar enough it may be beneficial to merge them and send only one filter, since this saves bits, even though the distortion may go up a bit due to the merged filter not being optimal for any of the two classes.

Figure 4:
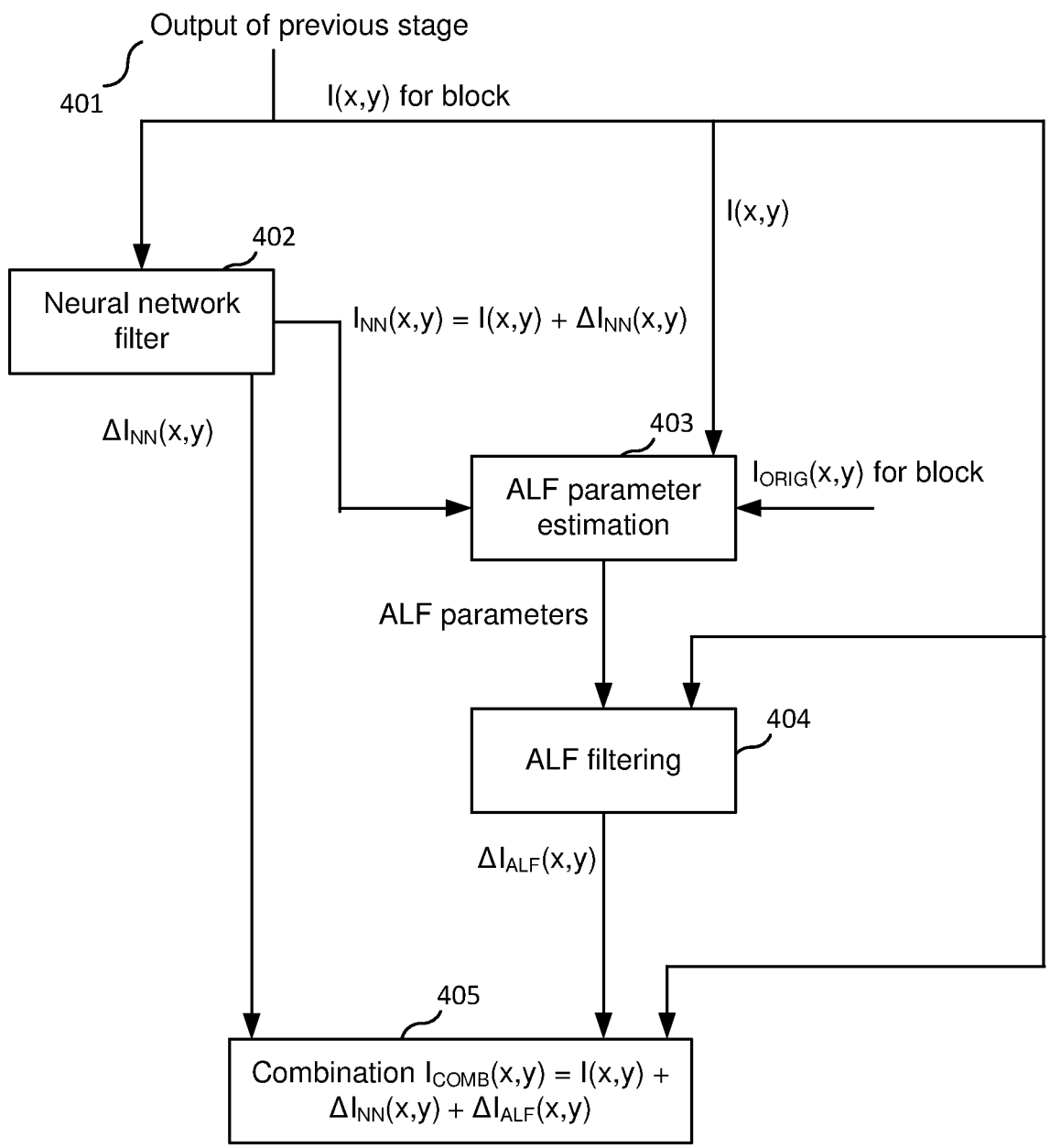
FIG. 4 is an example architecture of an encoder according to an embodiment.

In order reduce the number of loop filter stages, it may instead be beneficial to keep both filters in the same loop filter stage. This is shown in FIG. 4, where the neural network filter from [4] is used as filter 1, and ALF is used as filter two. In embodiments, other neural network filters may also be used. The output samples I(x,y) from the previous stage are filtered with the neural network 402 producing $I_{NN}(x,y)$. This is often done by first calculating a delta $\Delta I_{NN}(x,y)=DNN(I(x,y))$ and then producing the filtered output $I_{NN}(x,y)=I(x,y)+\Delta I_{NN}(x,y)$. The output is fed into the ALF parameter estimation step 403. This step also obtains the output samples I(x,y) from the previous step as well as the reference or original samples $I_{ORIG}(x,y)$.

Figure 9:
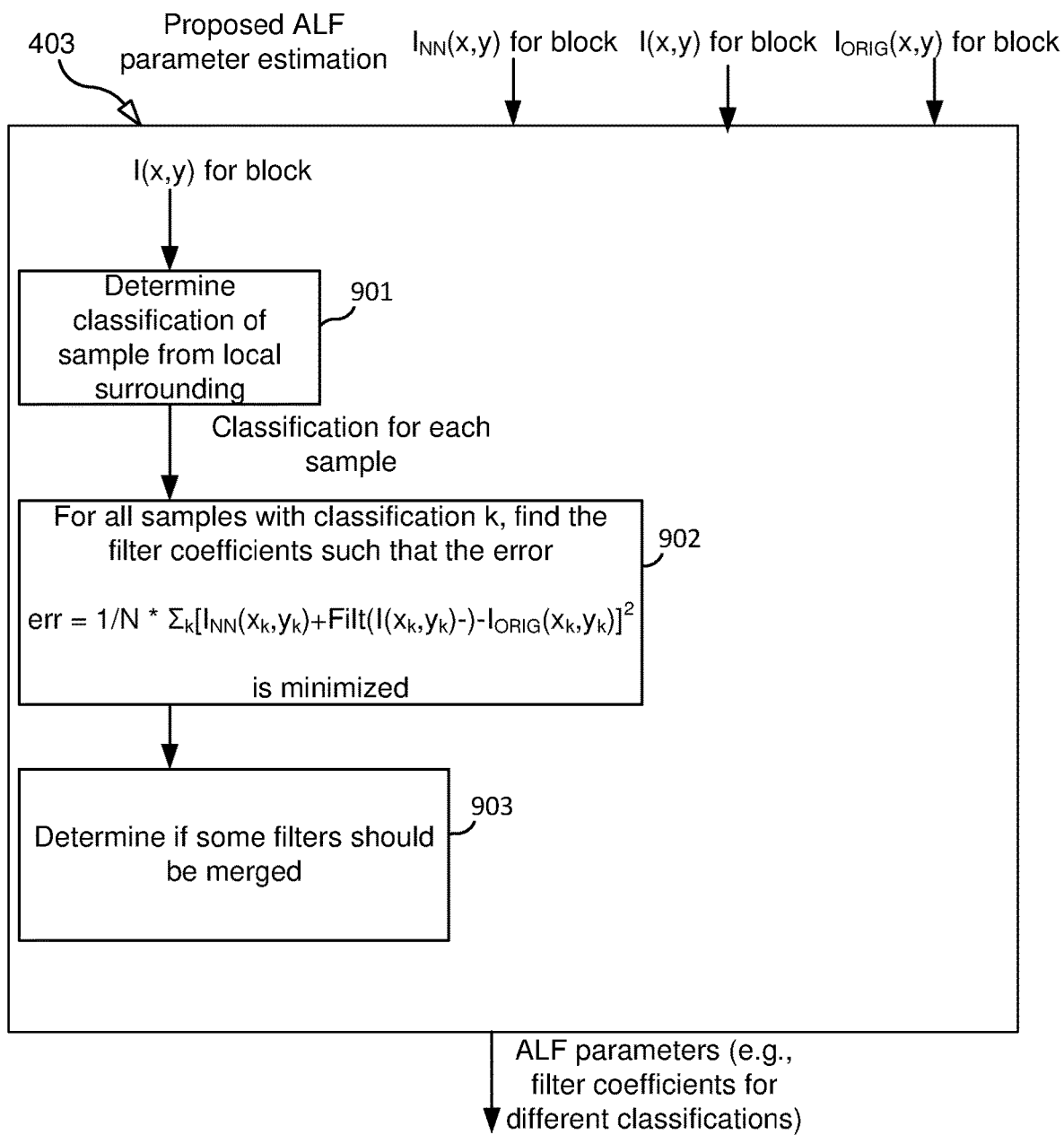
FIG. 9 is an example architecture of ALF parameter estimation according to an embodiment.

FIG. 9 shows the parameter estimation step 403 in more detail. The first step 901 uses the output samples I(x,y) from the previous stage as input. This means that the classification will happen exactly as is done in the decoder (see 1401 in FIG. 14 which also gets the output samples I(x,y) from the previous step as input). Step 902 calculates the best filter coefficients for a particular class. Instead of minimizing the error $$err = \sum_{k}[I(x_k, y_k) + FILT(I(x_k, y_k)) - I_{ORIG}(x_k, y_k)]^2$$

as was done for step 802 of FIG. 8, step 902 minimizes the error $$err = \sum_{k}[I_{NN}(x_k, y_k) + FILT(I(x_k, y_k)) - I_{ORIG}(x_k, y_k)]^2.$$

This means that it tries to find the filter coefficients that will bring the NN-filtered version $I_{NN}(x,y)$ closer to the original, instead of the filter coefficients that would bring the unfiltered samples I(x,y) closer to the original. This is a crucial difference since it means that the filter estimation step 902 will take into account improvements already done by the neural network (NN) filter.

Finally step 903 determines if some filters should be merged or not.

In conclusion, using the output samples I(x,y) from the previous stage in step 901 guarantees that the encoder will use the same classification as the decoder, and using the NN-filtered samples in step 902 guarantees that the encoder will take into account the corrections already performed by the neural network filtering step.

Alternative Embodiment

Figure 16:
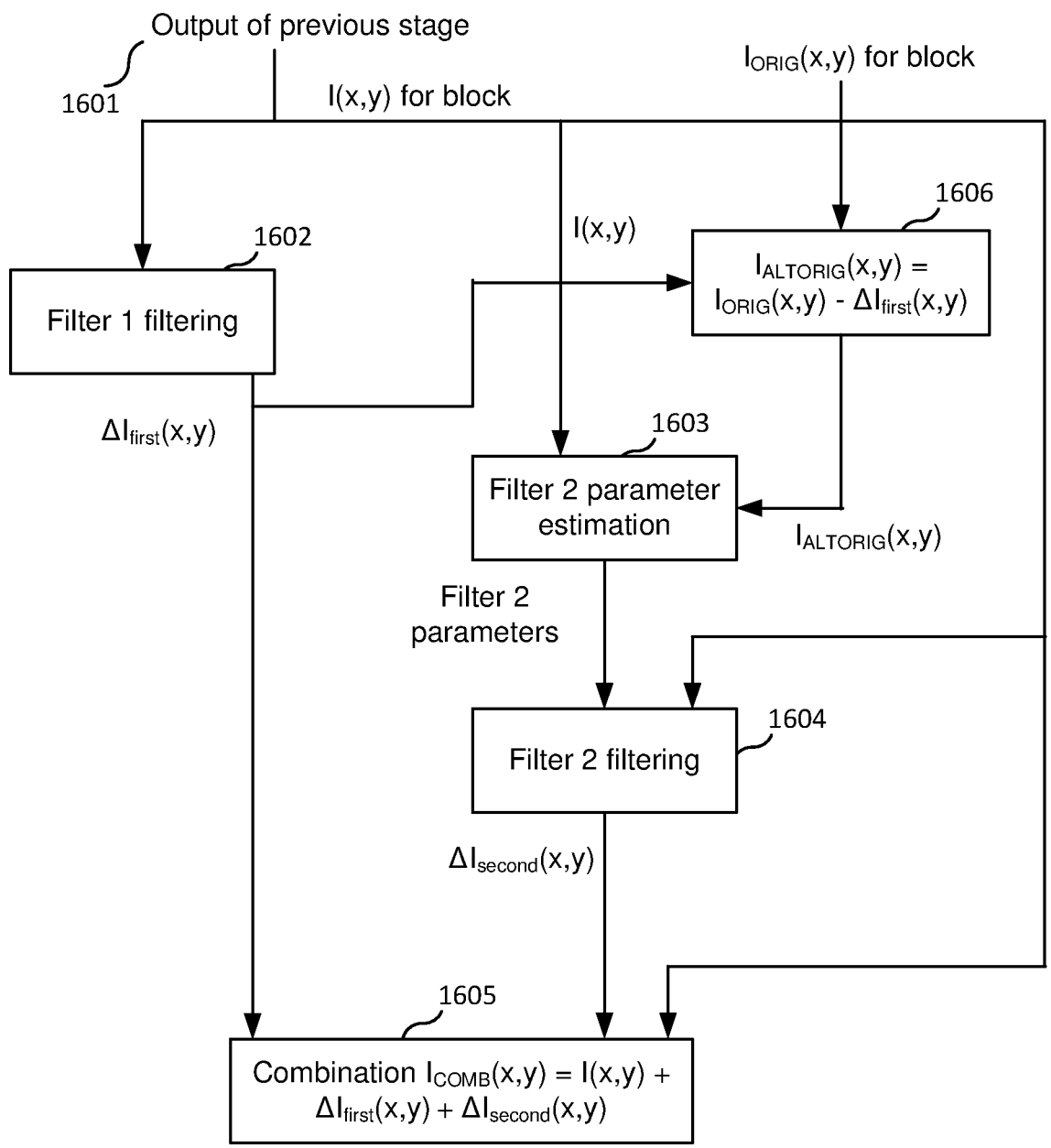
FIG. 16 is an example architecture of an encoder according to an embodiment.

An alternative embodiment is shown in FIG. 16. The output samples I(x,y) from the previous step are obtained at 1601 and are fed to Filter 1 at 1602. The output offset $\Delta I_{first}(x,y)$ is then fed to step 1606 which creates a new alternative original $I_{ALTORIG}(x,y)$ from the original $I_{ORIG}(x,y)$ and the filter offset from filter 1 $\Delta I_{first}(x,y)$. This alternative original is then fed to the filter 2 parameter estimation step 1603 as the original. Step 1603 also receives the output samples I(x,y) from the previous step. Thus, in this embodiment, $I_{first}(x,y)$ is not fed to the Filter 2 parameter estimation step 1603 which therefore only has two inputs (I(x,y) and $I_{ALTORIG}(x,y)$) instead of three as is the case with 1303 in FIG. 13.

Figure 5:
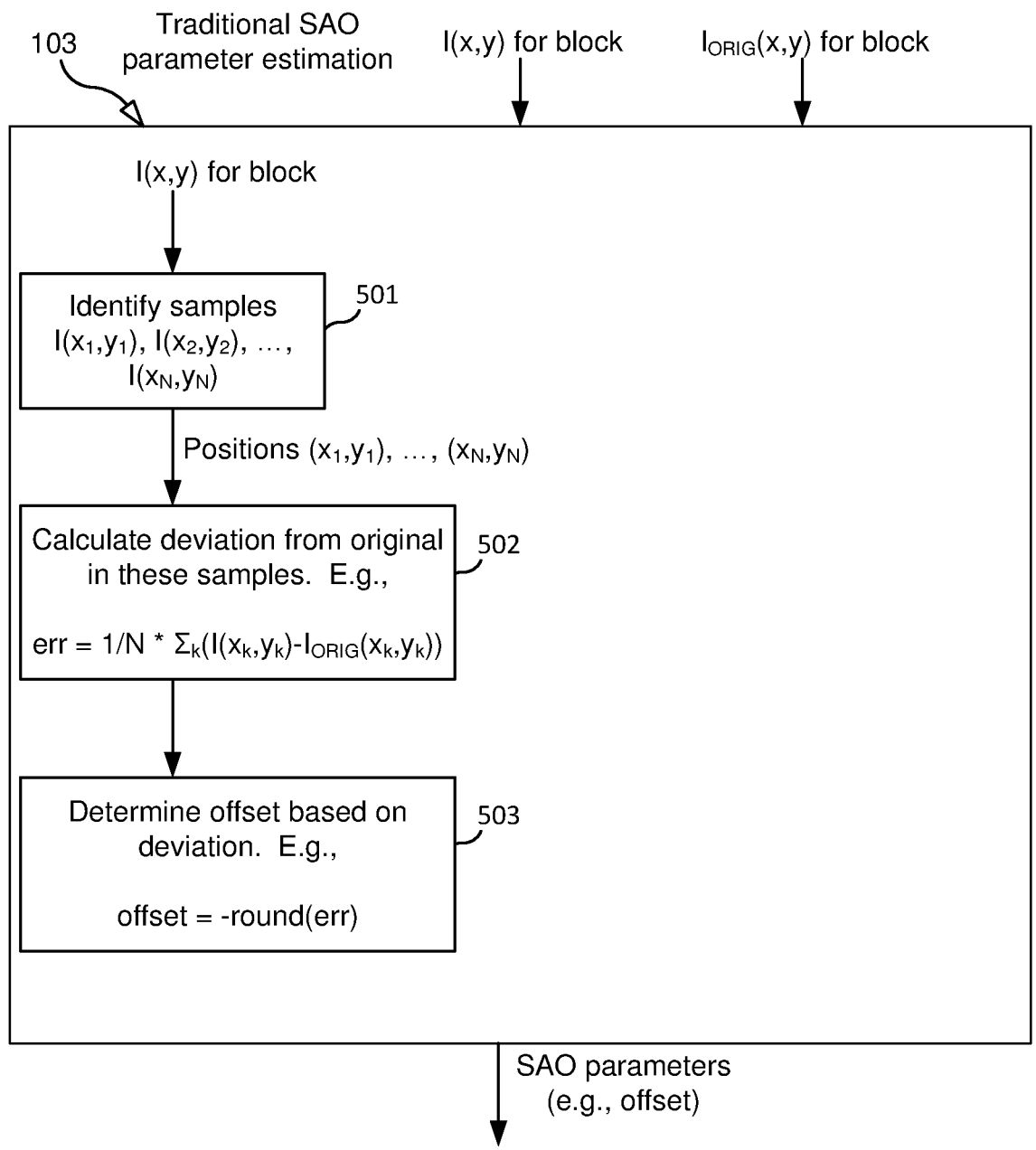
FIG. 5 is an example architecture of SAO parameter estimation according to a related art system.

If filter 2 is SAO, 1603 can be implemented according to FIG. 5, but with $I_{ALTORIG}(x,y)$ as input instead of $I_{ORIG}(x,y)$. Likewise, if filter 2 is ALF, 1603 can be implemented according to FIG. 8, but with $I_{ALTORIG}(x,y)$ as input instead of $I_{ORIG}(x,y)$. In general, 1603 can be implemented as it would have be done if the filter had its own loop filter stage (not being parallel with another filter) with the exception that $I_{ORIG}(x,y)$ is changed to $I_{ALTORIG}(x,y)$.

Figure 17:
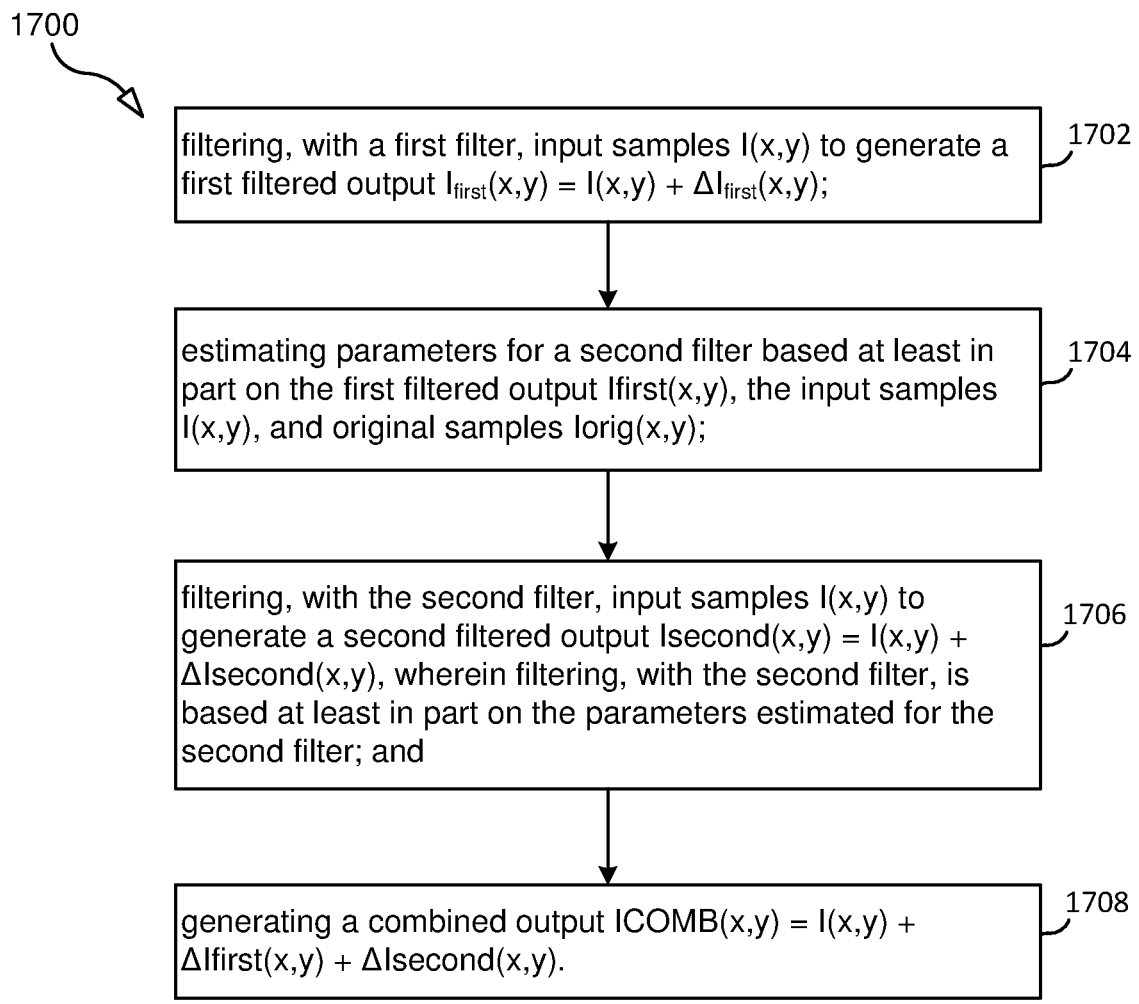
FIG. 17 is a flow chart according to an embodiment.

FIG. 17 illustrates a flow chart according to an embodiment. Process 1700 is a method for encoding one or more images. The method may begin with step s1702.

Step s1702 comprises filtering, with a first filter, input samples $I(x,y)$ to generate a first filtered output $I_{first}(x,y)=I(x,y)+\Delta I_{first}(x,y)$.

Step s1704 comprises estimating parameters for a second filter based at least in part on the first filtered output $I_{first}(x,y)$, the input samples $I(x,y)$, and original samples $I_{ORIG}(x,y)$.

Step s1706 comprises filtering, with the second filter, input samples $I(x,y)$ to generate a second filtered output $I_{second}(x,y)=I(x,y)+\Delta I_{second}(x,y)$, wherein filtering, with the second filter, is based at least in part on the parameters estimated for the second filter.

Step s1708 comprises generating a combined output $I_{COMB}(x,y)=I(x,y)+\Delta I_{first}(x,y)+\Delta I_{second}(x,y)$.

In some embodiments, the first filter comprises a bilateral filter and, in some embodiments, the second filter comprises a sample adaptive offset (SAO) filter. In some embodiments, estimating parameters for the second filter comprises: for each sample in the input samples $I(x,y)$, identifying a class associated with the sample, wherein identifying a class associated with the sample results in a set of classes with each class in the set of classes associated with zero or more positions $(x_i,y_i)$ corresponding to the samples $I(x_i,y_i)$ associated with the class; and for each class, (1) calculating a deviation between the first filtered output $I_{first}(x_i,y_i)$ and the original samples $I_{ORIG}(x_i,y_i)$ for each position $(x_i,y_i)$ associated with the class; and (2) determining an offset based on the deviation calculated. In some embodiments, (1) calculating a deviation between the first filtered output $I_{first}(x_i,y_i)$ and the original samples $I_{orig}(x_i,y_i)$ for each position $(x_i,y_i)$ associated with the class comprises computing $$err = \frac{1}{N}\Sigma[I_{first}(x_i, y_i) - I_{ORIG}(x_i, y_i)]$$

where N represents the number of positions $(x_i,y_i)$ associated with the class and (2) determining an offset based on the deviation calculated comprises computing the offset as −round(err).

In some embodiments, the first filter comprises a neural network filter and, in some embodiments, the second filter comprises an adaptive loop filter (ALF). In some embodiments, estimating parameters for the second filter comprises: for each sample in the input samples $I(x,y)$, identifying a class associated with the sample, wherein identifying a class associated with the sample results in a set of classes with each class in the set of classes associated with zero or more positions $(x_i,y_i)$ corresponding to the samples $I(x_i,y_i)$ associated with the class; and for each class, determining filter coefficients to minimize an error between the first filtered output $I_{first}(x_i,y_i)$ and the original samples $I_{ORIG}(x_i,y_i)$ for each position $(x_i,y_i)$ associated with the class. In some embodiments, determining filter coefficients to minimize an error between the first filtered output $I_{first}(x_i,y_i)$ and the original samples $I_{ORIG}(x_i,y_i)$ for each position $(x_i,y_i)$ associated with the class comprises minimizing err=$\Sigma[I_{first}(x_k,y_k)+Filt(I(x_k,y_k))-I_{ORIG}(x_k, y_k)]^2$ where Filt represents a filter having the determined filter coefficients.

In some embodiments, estimating parameters for a second filter based at least in part on the first filtered output $I_{first}(x,y)$, the input samples $I(x,y)$, and original samples $I_{ORIG}(x,y)$ comprises estimating parameters for a second filter based at least in part on the input samples $I(x,y)$ and altered original samples $I_{ALTORIG}(x,y)=I_{ORIG}(x,y)-\Delta I_{first}(x,y)$. In some embodiments, the second filter comprises a bilateral filter (BIF). In some embodiments, the estimated parameters for a second filter comprises an on/off switch for the second filter.

Figure 18:
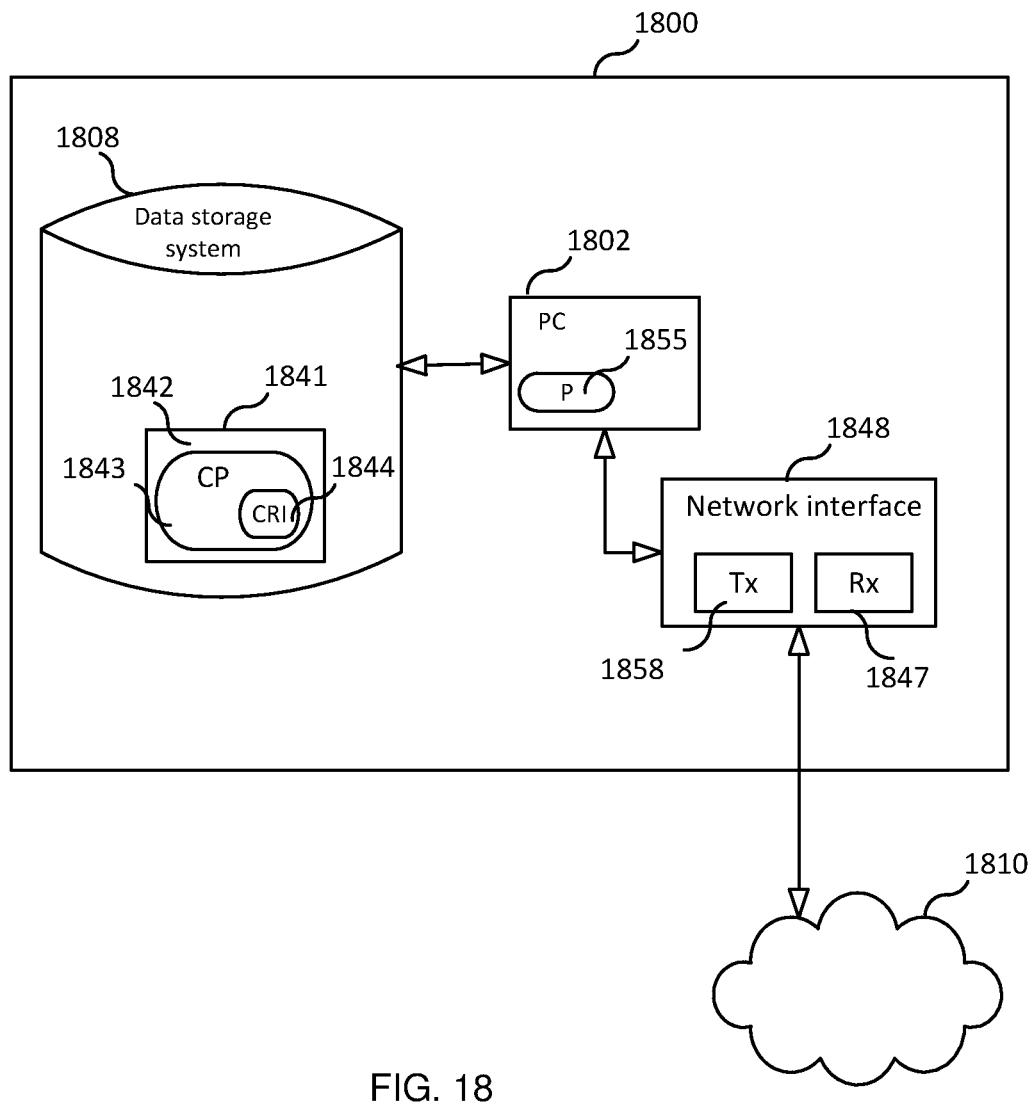
FIG. 18 is a block diagram of an encoder according to an embodiment.

FIG. 18 is a block diagram of encoder 1800, according to some embodiments. As shown in FIG. 18, encoder 1800 may comprise: processing circuitry (PC) 1802, which may include one or more processors (P) 1855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., encoder 1800 may be a distributed computing apparatus); at least one network interface 1848 (e.g., a physical interface or air interface) comprising a transmitter (Tx) 1845 and a receiver (Rx) 1847 for enabling encoder 1800 to transmit data to and receive data from other nodes connected to a network 1810 (e.g., an Internet Protocol (IP) network) to which network interface 1848 is connected (physically or wirelessly) (e.g., network interface 1848 may be coupled to an antenna arrangement comprising one or more antennas for enabling encoder 1800 to wirelessly transmit/receive data); and a local storage unit (a.k.a., "data storage system") 1808, which may include one or more non-volatile storage devices and/or one or more volatile storage devices. In embodiments where PC 1802 includes a programmable processor, a computer program product (CPP) 1841 may be provided. CPP 1841 includes a computer readable medium (CRM) 1842 storing a computer program (CP) 1843 comprising computer readable instructions (CRI) 1844. CRM 1842 may be a non-transitory computer readable medium, such as, magnetic media (e.g., a hard disk), optical media, memory devices (e.g., random access memory, flash memory), and the like. In some embodiments, the CRI 1844 of computer program 1843 is configured such that when executed by PC 1802, the CRI causes encoder 1800 to perform steps described herein (e.g., steps described herein with reference to the flow charts). In other embodiments, encoder 1800 may be configured to perform steps described herein without the need for code. That is, for example, PC 1802 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] P. Wennersten, J. Ström, Y. Wang, K. Andersson, R. Sjöberg, J. Enhorn, "Bilateral Filtering for Video Coding", IEEE Visual Communications and Image Processing (VCIP), December 2017. [Paper downloadable from: http://www.jacobstrom.com/publications/Wennersten_et_al_VCIP2017.pdf]

[2] J. Ström, P. Wennersten, J. Enhorn, R. Sjöberg, "CE1-related: Multiplication-free bilateral loop filter", JVET-N0493, 14th JVET Meeting: Geneva, CH, 19-27 Mar. 2019. [Paper downloadable as zip file from http://phenix.it-sudparis.eu/jvet/doc_end_user/documents/14_Geneva/wg11/JVET-N0493-v4.zip]

[3] S. Ikonin, V. Stepin, A. Karabutov, J. Chen, "CE1: Hadamard transform domain filter (CE1-2)", JVET-N0478, 14th JVET Meeting: Geneva, CH, 19-27 Mar. 2019. [Paper downloadable as zip file from http://phenix.it-sudparis.eu/jvet/doc_end_user/documents/14_Geneva/wg11/JVET-N0478-v3.zip]

[4] H. Wang, M. Karczewicz, J. Chen, A. M. Kotra, "AHG11: Neural Network-based In-Loop Filter", Joint Video Experts Team (JVET) of ITU-T SG 16 WP 3 and ISO/IEC JTC 1/SC 29 20th Meeting, by teleconference, 7-16 Oct. 2020. [Paper downloadable as zip file from https://jvet-experts.org/doc_end_user/documents/20_Teleconference/wg11/JVET-T0079-v3.zip]

[5] J. Ström, P. Wennersten, J. Enhorn, D. Liu, K. Andersson and R. Sjöberg, "Combined bilateral/SAO loop filter", Joint Video Experts Team (JVET) of ITU-T SG 16 WP 3 and ISO/IEC JTC 1/SC 29/WG 11 15th Meeting: Gothenburg, SE, 3-12 Jul. 2019. [Paper downloadable as zip file from https://jvet-experts.org/doc_end_user/documents/15_Gothenburg/wg11/JVET-O0548-v7.zip]

[6] COMBINED LOOP FILTERING FOR IMAGE PROCESSING, U.S. Application No. 62/865,533, filed 24 Jun. 2019

The invention claimed is:

1. A method for parameter estimation in loop filtering for encoding one or more images, the method comprising:
 filtering, with a first filter, input samples $I(x,y)$ to generate a first filtered output $I_{first}(x,y)=I(x,y)+\Delta I_{first}(x,y)$, wherein $\Delta I_{first}(x,y)$ represents a first offset to the input samples $I(x,y)$;
 estimating parameters for a second filter based at least in part on the first filtered output $I_{first}(x,y)$, the input samples $I(x,y)$, and original samples $I_{orig}(x,y)$, wherein the second filter comprises a sample adaptive offset (SAO) filter, wherein estimating parameters for the second filter comprises:
  for each sample in the input samples $I(x,y)$, identifying a class associated with the sample, wherein identifying a class associated with the sample results in a set of classes with each class in the set of classes associated with zero or more positions $(x_i,y_i)$ corresponding to the samples $I(x_i,y_i)$ associated with the class;
  for each class, (1) calculating a deviation between the first filtered output $I_{first}(x_i,y_i)$ and the original samples $I_{orig}(x_i,y_i)$ for each position $(x_i,y_i)$ associated with the class; and (2) determining an offset based on the deviation calculated;
 filtering, with the second filter, input samples $I(x,y)$ to generate a second filtered output $I_{second}(x,y)=I(x,y)+\Delta I_{second}(x,y)$, wherein $\Delta I_{second}(x,y)$ represents a second offset to the input samples $I(x,y)$ and filtering, with the second filter, is based at least in part on the parameters estimated for the second filter; and
 generating a combined output $ICOMB(x,y)=I(x,y)+\Delta I_{first}(x,y)+\Delta I_{second}(x,y)$.

2. The method of claim 1, wherein (1) calculating a deviation between the first filtered output $I_{first}(x_i,y_i)$ and the original samples $I_{orig}(x_i,y_i)$ for each position $(x_i,y_i)$ associated with the class comprises computing $$err = \frac{1}{N}\Sigma[I_{first}(x_i, y_i) - I_{ORIG}(x_i, y_i)]$$

where N represents the number of positions $(x_i,y_i)$ associated with the class and (2) determining an offset based on the deviation calculated comprises computing the offset as $-\text{round}(err)$.

3. The method of claim 2, wherein the estimated parameters for a second filter comprises an on/off switch for the second filter.

4. The method of claim 1, wherein the estimated parameters for a second filter comprises an on/off switch for the second filter.

5. A non-transitory computer readable medium comprising instructions which when executed by processing circuitry of an encoder for performing parameter estimation in loop filtering, causes the processing circuitry to:
 filter, with a first filter, input samples $I(x,y)$ to generate a first filtered output $I_{first}(x,y)=I(x,y)+\Delta I_{first}(x,y)$, wherein $\Delta I_{first}(x,y)$ represents a first offset to the input samples $I(x,y)$;
 estimate parameters for a second filter based at least in part on the first filtered output $I_{first}(x,y)$, the input samples $I(x,y)$, and original samples $I_{orig}(x,y)$, wherein the second filter comprises a sample adaptive offset (SAO) filter, wherein estimating parameters for the second filter comprises:
  for each sample in the input samples $I(x,y)$, identify a class associated with the sample, wherein identifying a class associated with the sample results in a set of classes with each class in the set of classes associated with zero or more positions $(x_i,y_i)$ corresponding to the samples $I(x_i,y_i)$ associated with the class;
  for each class, (1) calculate a deviation between the first filtered output $I_{first}(x_i,y_i)$ and the original samples $I_{orig}(x_i,y_i)$ for each position $(x_i,y_i)$ associated with the class; and (2) determine an offset based on the deviation calculated;
 filter, with the second filter, input samples $I(x,y)$ to generate a second filtered output $I_{second}(x,y)=I(x,y)+\Delta I_{second}(x,y)$, wherein $\Delta I_{second}(x,y)$ represents a second offset to the input samples $I(x,y)$ and filtering, with the second filter, is based at least in part on the parameters estimated for the second filter; and
 generate a combined output $I_{COMB}(x,y)=I(x,y)+\Delta I_{first}(x,y)+\Delta I_{second}(x,y)$.

6. The computer program of claim 5, wherein (1) calculating a deviation between the first filtered output $I_{first}(x_i,y_i)$ and the original samples $I_{orig}(x_i,y_i)$ for each position $(x_i,y_i)$ associated with the class comprises computing $$err = \frac{1}{N}\Sigma[I_{first}(x_i, y_i) - I_{ORIG}(x_i, y_i)]$$

where N represents the number of positions $(x_i,y_i)$ associated with the class and (2) determining an offset based on the deviation calculated comprises computing the offset as $-\text{round(err)}$.

7. The computer program of claim 5, wherein the estimated parameters for a second filter comprises an on/off switch for the second filter.

8. The computer program of claim 7, wherein the estimated parameters for a second filter comprises an on/off switch for the second filter.

9. An encoder for performing parameter estimation in loop filtering, the encoder comprising:
- processing circuitry; and
- a memory, the memory containing instructions executable by the processing circuitry, whereby when executed the processing circuitry is configured to:
  - filter, with a first filter, input samples I(x,y) to generate a first filtered output $I_{first}(x,y)=I(x,y)+\Delta I_{first}(x,y)$, wherein $\Delta I_{first}(x,y)$ represents a first offset to the input samples I(x,y);
  - estimate parameters for a second filter based at least in part on the first filtered output $I_{first}(x,y)$, the input samples I(x,y), and original samples $I_{orig}(x,y)$, wherein the second filter comprises a sample adaptive offset (SAO) filter, wherein estimating parameters for the second filter comprises:
    - for each sample in the input samples I(x,y), identify a class associated with the sample, wherein identifying a class associated with the sample results in a set of classes with each class in the set of classes associated with zero or more positions $(x_i,y_i)$ corresponding to the samples $I(x_i,y_i)$ associated with the class;
    - for each class, (1) calculate a deviation between the first filtered output $I_{first}(x_i,y_i)$ and the original samples $I_{orig}(x_i,y_i)$ for each position $(x_i,y_i)$ associated with the class; and (2) determine an offset based on the deviation calculated;
  - filter, with the second filter, input samples I(x,y) to generate a second filtered output $I_{second}(x,y)=I(x,y)+\Delta I_{second}(x,y)$, wherein $\Delta I_{second}(x,y)$ represents a second offset to the input samples I(x,y) and filtering, with the second filter, is based at least in part on the parameters estimated for the second filter; and
  - generate a combined output $I_{COMB}(x,y)=I(x,y)+\Delta I_{first}(x,y)+\Delta I_{second}(x,y)$.

10. The encoder of claim 9, wherein (1) calculating a deviation between the first filtered output $I_{first}(x_i,y_i)$ and the original samples $I_{orig}(x_i,y_i)$ for each position $(x_i,y_i)$ associated with the class comprises computing $$err = \frac{1}{N}\Sigma[I_{first}(x_i, y_i) - I_{ORIG}(x_i, y_i)]$$

where N represents the number of positions $(x_i,y_i)$ associated with the class and (2) determining an offset based on the deviation calculated comprises computing the offset as $-\text{round(err)}$.

11. The encoder of claim 9, wherein the estimated parameters for a second filter comprises an on/off switch for the second filter.

12. The encoder of claim 10, wherein the estimated parameters for a second filter comprises an on/off switch for the second filter.

* * * * *